United States Patent
Da Silva et al.

(10) Patent No.: US 12,010,535 B2
(45) Date of Patent: Jun. 11, 2024

(54) MEASUREMENT ADAPTATION BASED ON CHANNEL HARDENING

(71) Applicant: Telefonaktiebolaget LM Ericsson (publ), Stockholm (SE)

(72) Inventors: Icaro L. J. Da Silva, Solna (SE); Pradeepa Ramachandra, Linköping (SE); Victor Farias Monteiro, Fortaleza (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 497 days.

(21) Appl. No.: 17/291,024

(22) PCT Filed: Nov. 7, 2019

(86) PCT No.: PCT/EP2019/080524
§ 371 (c)(1),
(2) Date: May 4, 2021

(87) PCT Pub. No.: WO2020/094783
PCT Pub. Date: May 14, 2020

(65) Prior Publication Data
US 2021/0392526 A1    Dec. 16, 2021

Related U.S. Application Data

(60) Provisional application No. 62/757,499, filed on Nov. 8, 2018.

(51) Int. Cl.
| | | |
|---|---|---|
| *H04W 24/08* | (2009.01) | |
| *H04W 24/02* | (2009.01) | |
| *H04W 28/16* | (2009.01) | |

(52) U.S. Cl.
CPC ........... *H04W 24/08* (2013.01); *H04W 24/02* (2013.01); *H04W 28/16* (2013.01)

(58) Field of Classification Search
CPC ..... H04W 24/00; H04W 24/02; H04W 24/08; H04W 36/0085; H04W 36/0094;
(Continued)

(56) References Cited

U.S. PATENT DOCUMENTS

| 2015/0072624 A1* | 3/2015 | Weiner | H04B 1/0475 |
| | | | 455/65 |
| 2015/0131580 A1* | 5/2015 | Liu | H04B 7/0452 |
| | | | 370/329 |

(Continued)

FOREIGN PATENT DOCUMENTS

| KR | 20190089510 | * | 7/2019 | ............ H04W 24/02 |
| WO | 2017133775 A1 | | 8/2017 | |

(Continued)

OTHER PUBLICATIONS

Victor Farias Monteiro, "5G Measurement Adaptation Base on Channel Hardening Occurance", Sep. 2019, IEEE Communications Letter vol. 23, No. 9 (Year: 2019).*

(Continued)

*Primary Examiner* — Warner Wong
(74) *Attorney, Agent, or Firm* — Weisberg I.P.Law, P.A.

(57) ABSTRACT

A method, performed by a user equipment (UE), is provided. The method includes: obtaining a channel hardening (CH) parameter; changing a measurement parameter based on the obtained CH parameter; and adapting a measurement procedure in accordance with the changed parameter. A method performed by a network node, the method includes obtaining a channel hardening (CH) parameter corresponding to a user equipment (UE); and sending to the UE an indication that the UE is allowed to perform optimizations based on the obtained CH parameter.

18 Claims, 13 Drawing Sheets

1000

1002 — obtaining a channel hardening (CH) parameter corresponding to a user equipment (UE)

1012 — sending to a UE an indication (e.g., ChHardFlag) indicating that the UE is allowed to perform optimizations based on a CH parameter.

(58) Field of Classification Search
CPC ..... H04W 36/24; H04W 36/26; H04W 36/30; H04W 36/304; H04W 28/16; H04W 28/28; H04W 80/00; H04W 4/00; H04L 2025/03592; H04L 2025/03598; H04L 43/00; H04L 41/0803; H04L 41/0823
See application file for complete search history.

(56) References Cited

U.S. PATENT DOCUMENTS

| | | | | |
|---|---|---|---|---|
| 2017/0331577 | A1* | 11/2017 | Parkvall | H04J 11/0079 |
| 2017/0331670 | A1* | 11/2017 | Parkvall | H04L 41/0816 |
| 2018/0070321 | A1* | 3/2018 | Hessler | H04W 52/241 |
| 2018/0175992 | A1* | 6/2018 | Fröberg Olsson | H04L 5/0094 |
| 2020/0220677 | A1* | 7/2020 | Interdonato | H04L 5/0048 |
| 2021/0175949 | A1* | 6/2021 | Ahmed | H04L 25/0214 |
| 2021/0234574 | A1* | 7/2021 | Mao | H04B 7/0417 |

FOREIGN PATENT DOCUMENTS

| | | | | | |
|---|---|---|---|---|---|
| WO | WO-2017133775 | A1 * | 8/2017 | | H04B 17/104 |
| WO | 2017152929 | A1 | 9/2017 | | |
| WO | WO-2019099024 | A1 * | 5/2019 | | H04B 7/0417 |
| WO | WO-2019218317 | A1 * | 11/2019 | | H04B 7/0421 |
| WO | 2020011330 | A1 | 1/2020 | | |
| WO | WO-2020030848 | A1 * | 2/2020 | | H04B 7/0417 |
| WO | WO-2020075125 | A1 * | 4/2020 | | H04B 7/0626 |

OTHER PUBLICATIONS

Alex Oliveras Martinez, "Massive MIMO Properties Based on Measured Channels: Channel Hardening, User Decorrelation and Channel Sparsity", 978-1-5386-3954-2/16/$31.00 © 2016 IEEE (Year: 2016).*

Sara Willhammer, "Channel Hardening in Massive MIMO—a Measurement Based Analysis", 978-1-5386-3512-4/18/$31.00 © 2018 IEEE (Year: 2018).*

Zhen Chen, "Can We Rely on Channel Hardening in Cell-Free Massive MIMO?", 978-1-5386-3920-7/17/$31.00 © 2017 IEEE (Year: 2017).*

International Search Report and Written Opinion dated Jan. 22, 2020 for International Application No. PCT/EP2019/080524 filed Nov. 7, 2019, consisting of 16-pages.

3GPP TS 36.133 V15.4.0; 3rd Generation Partnership Project; Technical Specification Group Radio Access Network; Evolved Universal Terrestrial Radio Access (E-UTRA); Requirements for support of radio resource management (Release 15), Sep. 2018, consisting of 3227-pages.

3GPP TS 36.331 V15.3.0; 3rd Generation Partnership Project; Technical Specification Group Radio Access Network; Evolved Universal Terrestrial Radio Access (E-UTRA); Radio Resource Control (RRC); Protocol specification (Release 15), Sep. 2018, consisting of 918-pages.

3GPP TS 38.133 V15.3.0; 3rd Generation Partnership Project; Technical Specification Group Radio Access Network; NR; Requirements for support of radio resource management (Release 15), Sep. 2018, consisting of 136-pages.

3GPP TS 38.300 V15.3.1; 3rd Generation Partnership Project; Technical Specification Group Radio Access Network; NR; NR and NG-RAN Overall Description; Stage 2 (Release 15), Oct. 2018, consisting of 92-pages.

3GPP TS 38.331 V15.3.0; 3rd Generation Partnership Project; Technical Specification Group Radio Access Network; NR; Radio Resource Control (RRC) protocol specification (Release 15), Sep. 2018, consisting of 445-pages.

3GPP TSG RAN WG1 Meeting #85 R1-164117; Title: Overview of Massive MIMO for NR; Agenda Item: 7.1.6; Source: National Instruments; Document for: Discussion and Decision; Date and Location: May 23-27, 2016, Nanjing, China, consisting of 8-pages.

Sara Gunnarson et al.; Channel Hardening in Massive MIMO—A Measurement Based Analysis; IEEE 19th International Workshop on Signal Processing Advances in Wireless Communications (SPAWC); Jun. 20, 2018, consisting of 5-pages.

Paul Harris et al.; Performance Characterization of a Real-Time Massive MIMO System with LOS Mobile Channels; IEEE Journal on Selected Areas in Communications, vol. 35, No. 6, Jun. 2017, consisting of 10-pages.

* cited by examiner

MEASUREMENT ADAPTATION BASED ON CHANNEL HARDENING

CROSS-REFERENCE TO RELATED APPLICATIONS

This application is a Submission Under 35 U.S.C. § 371 for U.S. National Stage Patent Application of International Application No.: PCT/EP2019/080524, filed Nov. 7, 2019 entitled "MEASUREMENT ADAPTATION BASED ON CHANNEL HARDENING," which claims priority to U.S. Provisional Application No.: 62/757,499, filed Nov. 8, 2018, the entireties of both of which are incorporated herein by reference.

TECHNICAL FIELD

Disclosed are embodiments related to measurement adaptation based on channel hardening.

BACKGROUND

Procedures such as initial access, handover, and radio resource allocation each rely on accurate channel quality estimation. For such accurate channel quality estimation, e.g. in LTE and NR, a base station (BS) (e.g., gNB, eNB) and user equipment (UE) periodically transmit and receive synchronization and reference signals. However, LTE and NR measurement models are different, since NR is being standardized by 3GPP to rely heavily on beamforming, especially in the higher frequencies to overcome the propagation challenges in this part of the spectrum. Thus, NR is expected to have more synchronization and reference signals to be monitored than in LTE.

In NR, as physical channels and reference signals will rely on beamforming (possibly using quite narrow beams depending on operation frequency and coverage requirements), there could be a reduction on the number of multipath taps arriving at the receiver (narrow beams would act as spatial filters). Thus, the channel selectivity in time and frequency domains would be very low or even inexistent. That is, the overall channel response would look flat. This phenomenon is called the channel hardening (CH) effect. Hence, one envisioned way of making NR leaner than LTE is to exploit the CH effect to reduce transmissions and overhead.

The technical background concerning the LTE and NR measurement models follows. After this, a background on CH is provided.

First, the LTE measurement model is discussed.

LTE makes radio resource management (RRM) measurements for RRC_CONNECTED UEs. To enable the network to make educated mobility decisions (e.g. handover, reconfiguration with sync, release and redirect) an RRC_CONNECTED UE is configured by the network to perform so-called RRM measurements per cell in terms of reference signal received power (RSRP), reference signal received quality (RSRQ), and signal-to-interference-plus-noise ratio (SINR).

The measurement model in LTE is described in TS 36.300, as shown in FIG. 1. As shown, FIG. 1 includes "Layer 1 filtering", "Layer 3 filtering", and "Evaluation of reporting criteria." These modules, and their inputs and outputs, are described below.

A: measurements (samples) internal to the physical layer.

Layer 1 filtering: internal layer 1 filtering of the inputs measured at point A. Exact filtering is implementation dependant. How the measurements are actually executed in the physical layer by an implementation (inputs A and Layer 1 filtering) in not constrained by the standard.

B: A measurement reported by layer 1 to layer 3 after layer 1 filtering.

Layer 3 filtering: Filtering performed on the measurements provided at point B. The behaviour of the Layer 3 filters are standardised and the configuration of the layer 3 filters is provided by RRC signalling. Filtering reporting period at C equals one measurement period at B.

C: A measurement after processing in the layer 3 filter. The reporting rate is identical to the reporting rate at point B. This measurement is used as input for one or more evaluation of reporting criteria.

Evaluation of reporting criteria: This checks whether actual measurement reporting is necessary at point D. The evaluation can be based on more than one flow of measurements at reference point C e.g. to compare between different measurements. This is illustrated by input C and C'. The UE shall evaluate the reporting criteria at least every time a new measurement result is reported at point C, C'. The reporting criteria are standardised and the configuration is provided by RRC signalling (UE measurements).

D: Measurement report information (message) sent on the radio interface.

Layer 1 filtering will introduce a certain level of measurement averaging. How and when the UE exactly performs the required measurements will be implementation specific to the point that the output at B fulfils the performance requirements specified. Layer 3 filtering and parameters used are also specified and do not introduce any delay in the sample availability between B and C. Measurement at point C, C' is the input used in the event evaluation.

Layer 3 (L3) filtering is further detailed in TS 36.331 at 5.5.3.2. The standard indicates that the UE shall:

1> for each measurement quantity that the UE performs measurements according to 5.5.3.1:

NOTE 1: This does not include quantities configured solely for UE Rx-Tx time difference, SSTD measurements and RSSI, channel occupancy measurements, WLAN measurements of Band, Carrier Info, Available Admission Capacity, Backhaul Bandwidth, Channel Utilization, and Station Count, CBR measurement, sensing measurement and UL PDCP Packet Delay per QCI measurement i.e. for those types of measurements the UE ignores the triggerQuantity and reportQuantity.

2> filter the measured result, before using for evaluation of reporting criteria or for measurement reporting, by the following formula:

$$F_n = (1-a) \cdot F_{n-1} + a \cdot M_n$$

where $M_n$ is the latest received measurement result from the physical layer;

$F_n$ is the updated filtered measurement result, that is used for evaluation of reporting criteria or for measurement reporting;

$F_{n-1}$ is the old filtered measurement result, where F0 is set to M1 when the first measurement result from the physical layer is received; and $a = 1/2^{(k/4)}$, where k is the filterCoefficient for the corresponding measurement quantity received by the quantityConfig;

2> adapt the filter such that the time characteristics of the filter are preserved at different input rates, observing that the filterCoefficient k assumes a sample rate equal to 200 ms;

NOTE 2: If k is set to 0, no layer 3 filtering is applicable.

NOTE 3: The filtering is performed in the same domain as used for evaluation of reporting criteria or for measurement reporting, i.e., logarithmic filtering for logarithmic measurements.

NOTE 4: The filter input rate is implementation dependent, to fulfil the performance requirements set in TS 36.133. For further details about the physical layer measurements, see TS 36.133. TS 36.133 (LTE requirements) also describes measurement requirements and UE implementation details.

DRX is configured by the network so the UE does not have to monitor control channels during pre-defined periods but use these for actions, such as perform measurements. When no DRX is in use the UE shall be able to identify a new detectable intra frequency cell operating in FDD within $$T_{identify\ intra} = T_{basic\_identify\_E-UTRA\_FDD, intra} \cdot \frac{T_{Measurement\_Period, Intra}}{T_{Intra}}\ ms$$

where $T_{basic\_identify\_E-UTRA\_FDD}$, intra is 800 ms and $T_{Intra}$ is the minimum time that is available for intra frequency measurements, during the measurement period with an arbitrarily chosen timing. Time is assumed to be available for performing intra frequency measurements whenever the receiver is guaranteed to be active on the intra frequency carrier.

Identification of a cell shall include detection of the cell and additionally performing a single measurement with measurement period of $T_{Measurement\_Period\ Intra}$. If higher layer filtering is used (i.e. L3 filtering), an additional cell identification delay can be expected. That suggests that the usage of higher layer filtering implies longer delays in performing measurements.

When no measurement gaps are activated, the UE shall be capable of performing RSRP, RSRQ, and RS-SINR measurements for 8 identified-intra-frequency cells, and the UE physical layer shall be capable of reporting measurements to higher layers with the measurement period of 200 ms.

In the RRC_CONNECTED state the measurement period for intra frequency measurements is 200 ms. That means that the neighbour cell measurements are averaged over a long time period, in the order of 200 ms or even longer, to filter out the effect of small scale fading. Cell measurements in LTE and NR have the following measurement quantities associated: RSRP, RSRQ and SINR.

Summary: Every 200 ms the L1 is required to provide a sample to the RRC layer. However, it is not directly specified how these samples are computed in terms of averaging in the time domain which may occur within these 200 ms. In a very typical implementation, the overall neighbour cell measurement quantity results comprise non-coherent averaging of 2 or more basic non-coherent averaged samples. An example of RSRP measurement averaging in E-UTRAN is shown in FIG. 2.

As shown, FIG. 2 illustrates that the UE obtains the overall measurement quantity result by collecting four non-coherent averaged samples or snapshots, each of 3 ms length in this example, during the physical layer measurement period, e.g. 200 ms. Every coherent averaged sample is 1 ms long. In this example, a 3 ms non-coherent sample comprises 3 consecutive coherent samples. The measurement accuracy of the neighbour cell measurement quantity, e.g. RSRP or RSRQ, is specified over the physical layer measurement period. It should be noted that the sampling rate is UE implementation specific. Therefore, in another implementation a UE may use only 3 snapshots over a 200 ms interval or measurement period. Regardless of the sampling rate, it is important that the measured quantity fulfils the performance requirements in terms of the specified measurement accuracy.

And, if L3 filtering is configured by the network, to mitigate the effects of fading and possibly avoid ping-pong handovers based on a decision of a temporary sample that is too good, the L3 performs a filtering procedure that considers a previously filtered value (from the sample received in the past 200 ms) and the new sample. FIG. 3 illustrates the L3 filtering that is performed. L1 filtering is not directly specified by 3GPP. Hence, UE implementation has some freedom but needs to fulfill accuracy requirements. However, the L1 itself may apply its own frequency and time domain filtering within these periodicity=200 ms with more or less sparse samples, e.g. as a sliding window with its own L1 time window periodicity <200 ms.

The goal of the neighbour cell quality measurement is to estimate and predict the long term downlink quality that can be experienced by the UE in a particular cell or beam, in the case of NR. It should indeed indicate the signal quality or throughput that the UE will achieve in a cell. This prediction enables the UE and the network to choose the most appropriate cell when performing cell reselection and handovers, respectively. In E-UTRAN any set of resource blocks (i.e. part of the cell bandwidth) can be assigned to the UE for transmission. Therefore the quality measurement should capture the overall long-term average quality over the entire bandwidth or at least over the largest possible portion of the bandwidth. This is in contrast with E-UTRAN Cell of Interest (COI) measurement, which typically depicts short term quality of possibly a subset of the resource blocks from the serving cell.

Beamforming in 5G NR is now described. To support the long-term traffic demands and to efficiently enable the very wide transmission bandwidths needed for multi-Gb/s data rates, the range of operation might not only range to frequencies below 6 GHz (currently used for LTE) but also higher frequencies up to 100 GHz. In comparison to the current frequency bands allocated to LTE, more challenging propagation conditions exists, such as lower diffraction and higher outdoor/indoor penetration losses, which means that signals will have less ability to propagate around corners and penetrate walls. In addition, atmospheric/rain attenuation and higher body losses could also contribute to making the coverage of the new 5G air interface spotty.

Beamforming, where multiple antenna elements are used to form narrow beams, is an efficient tool for improving both data rates and capacity. Its extensive use, in particular at the network side, is an essential part of high-frequency wireless access in order to overcome the propagation challenges highlighted earlier. The operation in higher frequencies is one of the drivers for beamforming based solutions since high frequencies makes it possible to use smaller antenna elements enabling deployments of larger antenna arrays.

For these reasons, the 5G radio interface currently being standardized in 3GPP, called NR, has been designed considering that physical channels (e.g., PDCCH, PDSCH, PUCCH, etc.) and reference signals for control plane procedures (such as measurements for mobility, link adaptation, channel status reporting, etc.) will rely heavily on beamforming.

RRM measurements in NR for RRC_CONNECTED UEs is now described. As in LTE (described above), in NR, handovers in RRC_CONNECTED may also be assisted by measurements reported by the UE. Despite the similarities, LTE and NR measurement models have significant differences, especially concerning the need to address the fact that, in NR, reference signals are beamformed. That is summarized in TS 38.300, and as shown in FIG. 4.

As shown, FIG. 4 includes modules for "Layer 1 filtering" (for each respective gNB beam), "Layer 3 filtering" and "Evaluation of reporting criteria". Additionally, FIG. 4 also includes "Beam consolidation/selection" and "Beam selection for reporting" modules, as well as individual Layer 3 filtering for each gNB beam. These modules, and their inputs and outputs, are described below.

NOTE: K beams correspond to the measurements on NR Synchronization Signal (SS) block or channel state information reference signal (CSI-RS) resources configured for L3 mobility by gNB and detected by UE at L1.

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard.

A1: measurements (i.e. beam specific measurements) reported by layer 1 to layer 3 after layer 1 filtering.

Beam Consolidation/Selection: beam specific measurements are consolidated to derive cell quality. The behaviour of the Beam consolidation/selection is standardised and the configuration of this module is provided by RRC signalling. Reporting period at B equals one measurement period at A1.

B: a measurement (i.e. cell quality) derived from beam-specific measurements reported to layer 3 after beam consolidation/selection.

Layer 3 filtering for cell quality: filtering performed on the measurements provided at point B. The behaviour of the Layer 3 filters is standardised and the configuration of the layer 3 filters is provided by RRC signalling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C e.g. to compare between different measurements. This is illustrated by input C and C1. The UE shall evaluate the reporting criteria at least every time a new measurement result is reported at point C, C1. The reporting criteria are standardised and the configuration is provided by RRC signalling (UE measurements).

D: measurement report information (message) sent on the radio interface.

L3 Beam filtering: filtering performed on the measurements (i.e. beam specific measurements) provided at point A1. The behaviour of the beam filters is standardised and the configuration of the beam filters is provided by RRC signalling. Filtering reporting period at E equals one measurement period at A1.

E: a measurement (i.e. beam-specific measurement) after processing in the beam filter. The reporting rate is identical to the reporting rate at point A1. This measurement is used as input for selecting the X measurements to be reported.

Beam Selection for beam reporting: selects the X measurements from the measurements provided at point E. The behaviour of the beam selection is standardised and the configuration of this module is provided by RRC signalling.

F: beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in 3GPP TS 38.133 V15.3.0. Layer 3 filtering for cell quality and related parameters used are specified in 3GPP TS 38.331 V15.3.0 and do not introduce any delay in the sample availability between B and C. Measurement at point C, C1 is the input used in the event evaluation. L3 Beam filtering and related parameters used are specified in 3GPP TS 38.331 V15.3.0 and do not introduce any delay in the sample availability between E and F.

There are several differences between LTE and NR measurement model. A first difference compared to LTE is that, in NR, L1 filters are defined per beam before cell quality is computed based on L1 beam measurements e.g. RSRP, RSRQ or SINR. Then, these cell level measurements can be L3 filtered, as in LTE. A second difference is the possibility to report these beam measurements in NR. In that case, the L1 beam measurements are also L3 filtered, based on configured values from the network by RRC.

Requirements in terms of measurements in RRC_CONNECTED are also defined in NR, but in TS 38.331 specifications and with different values.

The CH effect is now described. Transmitters and receivers are surrounded by objects, which reflect and scatter the transmitter energy, causing several waves to arrive at the receiver via different routes. These multipath components usually have different phase and amplitude leading to frequency selective fading and time dispersion. In the frequency domain, the coherence bandwidth of a channel is a metric used to measure the range of frequencies over which all spectral components have approximately equal gain and linear phase, i.e., the range of frequencies over which the channel can be considered "flat". In the time domain, the root mean square (RMS) delay spread is used as an indicator of the multipath dispersion. It takes into account the relative power of the different taps as well as their delays. The coherence bandwidth and the RMS delay spread are inversely proportional. When deploying narrow beams, they might act as a spatial filter (with narrow spatial bandwidth) on different delay taps of the channel response. Since part of the scatters are no longer illuminated, the number of multipath taps might decrease, thus the channel RMS delay spread might reduce and the overall channel response might look flat. In general, the narrower the beam the flatter the channel response is.

Recent works also identified the existence of CH in real environments (e.g., indoor environments such as an auditorium or moving UEs in an outdoor environment) based on measurements.

In GUNNARSSON, S. et al. "Channel Hardening in Massive MIMO—A Measurement Based Analysis," CoRR, abs/1804.01690, May 2018 (available from <arxiv.org/abs/1804.01690>), the authors considered an indoor crowded auditorium at Lund University with one BS and nine closely-spaced UEs placed as depicted in FIG. 5A. Line of Sight (LOS) propagation conditions predominated, with occasional blocking due to other UEs or room furniture. The BS acted as a receive unit and it was equipped with 64 dual-polarized patch antennas, i.e., 128 antenna elements. UEs and BS were communicating at center frequency of 2.60 GHz and bandwidth of 40 MHz. 129 measured points in frequency and 300 snapshots were taken over 17 s. FIG. 5B illustrates the normalized channel gains of UE 1 when using one antenna (lower layer 504) versus the case of combining the channel of all 128 antenna elements (upper layer 502). Notice that the channel of just one antenna element presents many severe dips and varies much more than the case with 128 antenna elements which has relatively few variations. In other words, the channel hardened when considering more antenna elements.

In HARRIS, P. et al. "Performance Characterization of a Real-Time Massive MIMO System With LOS Mobile Channels." IEEE Journal on Selected Areas in Communications, v. 35, n. 6, p. 1244-1253, June 2017 (DOI: 10.1109/JSAC.2017.2686678), the authors considered the uplink communication between single antenna UEs and a BS with 100 antenna elements deployed at 3.70 GHz and bandwidth of 20 MHz. FIG. 6A illustrates one of the analyzed scenarios as viewed from the BS. The considered UE was moving at speed of 29 km/h. Its trajectory is indicated by the arrow in FIG. 6A having a curved trajectory. FIG. 6B illustrates the relative channel magnitude measured by a single antenna and the composite channel of the 100 antenna elements. The authors concluded that the composite channel tends to follow the average of the single antenna case, smoothing out the fast fading. In the analyzed scenario, larger variations started to occur over the course of seconds rather than milliseconds. They also noticed improvements in robustness and latency due to the mitigation of fast-fade error bursts.

SUMMARY

Embodiments provide a UE adjusting the properties of RRM measurements used to assist mobility procedures performed by the UE based on the detection of channel hardening occurrence or detection of channel hardening absence. Channel hardening (CH) may occur, e.g. due to narrow beamforming of reference signals. In embodiments, the adjustment of measurement properties is done upon the occurrence of an event related to channel hardening (such as the increase of a CH metric going above a threshold). The adjustment may also be done periodically, once CH related event is triggered. Additionally, embodiments may provide for a CH event leaving condition, which can indicate when a CH condition is no longer active.

According to a first aspect, a method, performed by a user equipment (UE), is provided. The method includes: obtaining a channel hardening (CH) parameter; changing a measurement parameter based on the obtained CH parameter; and adapting a measurement procedure in accordance with the changed parameter.

In some embodiments, the measurement procedure is a radio resource management (RRM) measurement which involves measuring a quantity including one or more of a channel quality indicator (CQI), a reference signal received power (RSRP), a reference signal received quality (RSRQ), and a carrier received signal strength indicator (RSSI). In some embodiments the measurement parameter is selected from the group consisting of a measurement period, a sample length, a length of coherent averaging, a measurement bandwidth, a set of reference signals, and a number of beams to average. In some embodiments, obtaining the CH parameter comprises obtaining an indication that a CH condition is present and as a result of the CH condition being present, changing the measurement parameter. In some embodiments, obtaining the indication that the CH condition is present comprises determining that the CH parameter is less than a first CH threshold.

In some embodiments, the method further includes, as a result of obtaining the indication that the CH condition is present, periodically changing the measurement parameter based on the obtained CH parameter. In some embodiments, the method further includes determining that the CH condition is not present and, as a result of determining that the CH condition is not present, ceasing to periodically change the measurement parameter based on the obtained CH parameter. In some embodiments, changing a measurement parameter based on the obtained CH parameter comprises determining that a CH condition is not present and as a result of the CH condition not being present, changing the measurement parameter. In some embodiments, determining that the CH condition is not present comprises determining that the CH parameter exceeds a second CH threshold.

In some embodiments, obtaining the CH parameter comprises determining a first CH parameter for a first frequency and/or carrier and/or band and a second CH parameter for a second frequency and/or carrier and/or band; and changing the measurement parameter based on the obtained CH parameter comprises changing the measurement parameter on the first frequency and/or carrier and/or band based on the determined first CH parameter and not changing the measurement parameter on the second frequency and/or carrier and/or band based on the determined second CH parameter. In some embodiments, obtaining the CH parameter comprises determining a first CH parameter for a first cell and a second CH parameter for a second cell; and changing the measurement parameter based on the obtained CH parameter comprises changing the measurement parameter on the first cell and/or band based on the determined first CH parameter and not changing the measurement parameter on the second cell based on the determined second CH parameter. In some embodiments, obtaining the CH parameter comprises determining a first CH parameter for a first beam and/or group of beams and a second CH parameter for a second beam and/or group of beams; and changing the measurement parameter based on the obtained CH parameter comprises changing the measurement parameter on the first beam and/or group of beams and/or band based on the determined first CH parameter and not changing the measurement parameter on the second beam and/or group of beams based on the determined second CH parameter.

In some embodiments, changing a measurement parameter based on the obtained CH parameter comprises increasing a measurement period because the CH parameter is less than a threshold. In some embodiments, changing a measurement parameter based on the obtained CH parameter comprises decreasing a measurement period because the CH parameter exceeds a threshold. In some embodiments, changing a measurement parameter based on the obtained CH parameter comprises decreasing a sample length for performing non-coherent averaging because the CH parameter is less than a threshold. In some embodiments, changing a measurement parameter based on the obtained CH parameter comprises increasing a sample length for performing non-coherent averaging because the CH parameter exceeds a threshold. In some embodiments, changing a measurement parameter based on the obtained CH parameter comprises decreasing a length of coherent averaging because the CH parameter is less than a threshold. In some embodiments, changing a measurement parameter based on the obtained CH parameter comprises increasing a length of coherent averaging because the CH parameter exceeds a threshold.

In some embodiments, changing a measurement parameter based on the obtained CH parameter comprises reducing a measurement bandwidth because the CH parameter is less than a threshold. In some embodiments, changing a measurement parameter based on the obtained CH parameter comprises increasing a measurement bandwidth because the CH parameter exceeds a threshold. In some embodiments, changing a measurement parameter based on the obtained CH parameter comprises setting a reference signal parameter because the CH parameter is less than a threshold, such that the reference signal parameter indicates to only use secondary synchronization signals (SSSs) from a synchronization signal block (SSB), and not to use demodulation reference signals (DMRSs) from the SSB.

In some embodiments, changing a measurement parameter based on the obtained CH parameter comprises setting a reference signal parameter because the CH parameter is less than a threshold, such that the reference signal parameter indicates to only use reference signals from a synchronization signal block (SSB), and not to use channel state information reference signals (CSI-RSs). In some embodiments, changing a measurement parameter based on the obtained CH parameter comprises reducing a set of beams for deriving cell quality because the CH parameter is less than a threshold. In some embodiments, changing a measurement parameter based on the obtained CH parameter comprises increasing a set of beams for deriving cell quality because the CH parameter exceeds a threshold.

In some embodiments, the CH parameter is a binary value that indicates either the presence or absence of a CH condition. In some embodiments, the CH parameter is an analog value that indicates a degree of a CH condition. In some embodiments, obtaining the CH parameter comprises: recording a set of previous channel estimations in a sliding window; estimating a standard deviation from the recorded set; and assigning the CH parameter based on the estimated standard deviation. In some embodiments, assigning the CH parameter based on the estimated standard deviation comprises assigning a parameter indicating the presence of a CH condition if the standard deviation is less than a first threshold (e.g., 0.8 dBm) and assigning a parameter indicating the absence of a CH condition if the standard deviation is greater than or equal to the first threshold (e.g., 0.8 dBm). In some embodiments, assigning the CH parameter based on the estimated standard deviation comprises assigning a parameter indicating the presence of a strong CH condition if the standard deviation is less than a first threshold (e.g., 0.3 dBm), assigning a parameter indicating the presence of a weak CH condition if the standard deviation is between the first threshold and a second threshold (e.g., 0.8 dBm), and assigning a parameter indicating the absence of a CH condition if the standard deviation is greater than or equal to the second threshold (e.g., 0.8 dBm).

In some embodiments, the method further includes signaling to a network node (e.g., a base station) the CH parameter. In some embodiments, the method further includes receiving from a network node (e.g., a base station) an indication that the UE is allowed to perform optimizations based on the CH parameter. For example the indication may be a flag (e.g., ChHardFlag).

According to a second aspect, a method, performed by a network node (e.g., a base station), is provided. The method includes: obtaining a channel hardening (CH) parameter corresponding to a user equipment (UE); and sending to the UE an indication that the UE is allowed to perform optimizations based on the obtained CH parameter.

In some embodiments, the method further includes collecting statistics regarding CH conditions at the UE. In some embodiments, the method further includes signaling to the UE the CH parameter. In other embodiments obtaining the CH parameter comprises receiving the CH parameter from the UE. In some embodiments, the method further includes adapting transmission of synchronization and reference signals based on the obtained CH parameter. In some embodiments, adapting transmission of synchronization and reference signals based on the obtained CH parameter comprises reducing transmission of synchronization signal blocks (SSBs) and channel state information reference signals (CSI-RSs) based on the UE being in a CH condition.

In some embodiments, the indication further indicates a granularity at which the UE is allowed to perform optimizations based on the CH parameter. In some embodiments, the granularity is per frequency and/or per carrier and/or per band. In some embodiments, the granularity is per cell. In some embodiments, the granularity is per beam and/or group of beams. In some embodiments, the granularity is per reference signal.

According to a third aspect, a user equipment (UE) configured to perform any of the embodiments of the first aspect is provided. For example, the UE is configured to: obtain a channel hardening (CH) parameter; change a measurement parameter based on the obtained CH parameter; and adapt a measurement procedure in accordance with the changed parameter.

According to a fourth aspect, a network node (e.g. base station (BS)) arranged to perform any of the embodiments of the second aspect is provided. For example, the network node is arranged to: obtain a channel hardening (CH) parameter corresponding to a user equipment (UE); and send to the UE an indication that the UE is allowed to perform optimizations based on the obtained CH parameter.

According to a fifth aspect, a computer program is provided. The computer program includes instructions which when executed by processing circuitry of a node causes the node to perform the method of any one of the embodiments of the first or second aspect.

According to a sixth aspect, a carrier is provided. The carrier contains the computer program of the fifth aspect, wherein the carrier is one of an electronic signal, an optical signal, a radio signal, and a computer readable storage medium.

Advantages include reducing the amount of measurements a UE performs. The reduction in measurements could be significantly higher in NR compared to LTE, due to the fact that the UE could be configured to monitor multiple beams (or beamformed reference signals). This may result in significant power savings. Advantages also include reducing the amount of periodic measurement reports. For example, if a UE or network is aware that the channel is hardened, then the periodicity of reports from the UE to the network, or from the network to the UE, can be optimized. This leads to more efficient UE battery consumption, shorter measurement reports, and reduced signaling load e.g. in UL control channels.

Additional advantages also include reducing interference and making the system leaner, as the network can take actions based on the UE report periodicity, such as reducing synchronization signal blocks (SSBs) and CSI-RS transmissions if UEs are set (based on configuration) to not be measuring them. In other words, when the network knows that the UE is applying certain embodiments such as using longer measurement periods, the network may also transmit some reference signals within these longer periods e.g. CSI-RSs.

Other advantages are also possible. For example, when using longer measurement periods, for example, the network may relax its DRX configuration. When DRX is configured, the UE does not have to monitor the control channel, as the network would not schedule any data. Hence, relaxing the DRX configuration to longer periods means that the UE may be scheduled more often, which has also the potential to improve the data rates the user experiences and/or reduce the latency.

Further, in embodiments, the UE may be able to perform measurements on more carriers, or more accurately perform measurements on a given number of carriers, due to the UE spending less time on measurements on a hardened channel while using the gaps (where measurements on a hardened channel are not performed) to perform measurements on other carriers e.g. without sacrificing the measurement accuracy requirements in those carriers. Another way to interpret this advantage is that the UE can be configured with longer gap periods thus enabling higher throughput in the serving carrier.

BRIEF DESCRIPTION OF THE DRAWINGS

The accompanying drawings, which are incorporated herein and form part of the specification, illustrate various embodiments.

DETAILED DESCRIPTION

Figure 1:
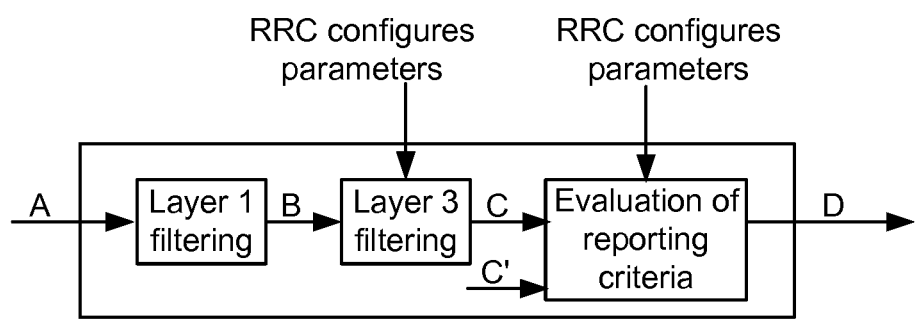
FIG. 1 illustrates an LTE measurement model.
Figure 2:
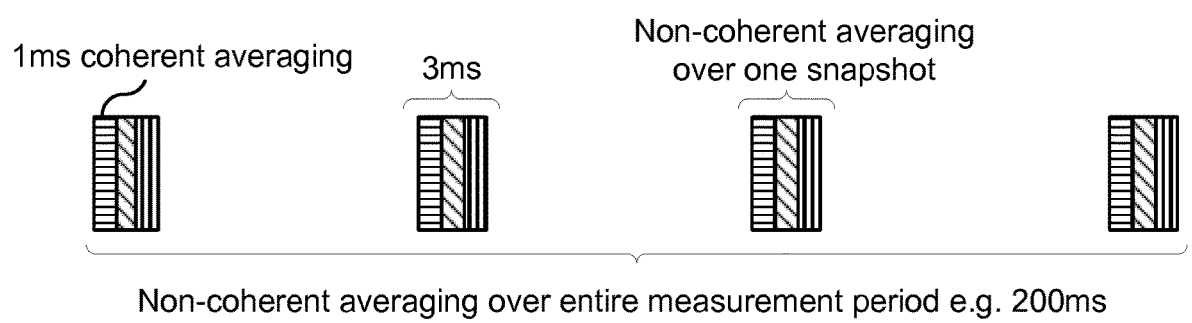
FIG. 2 illustrates non-coherent averaging over a measurement period.
Figure 3:
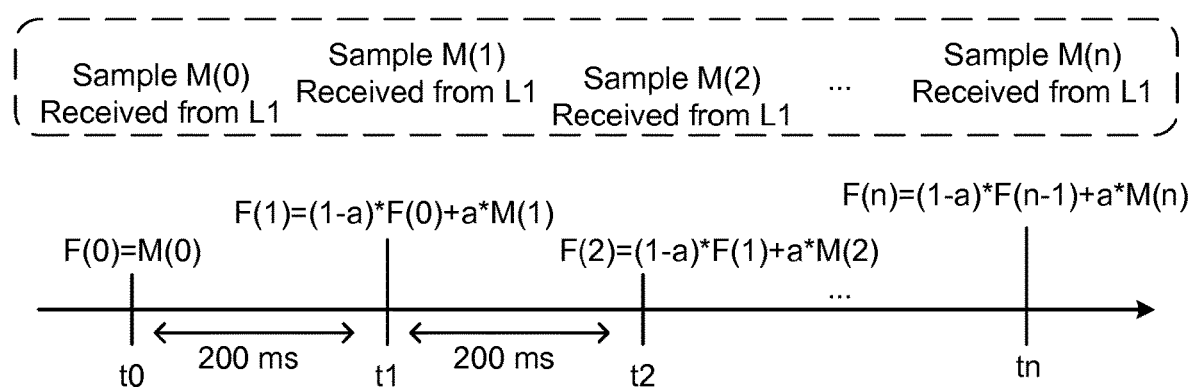
FIG. 3 illustrates level 2 (L2) filtering.
Figure 4:
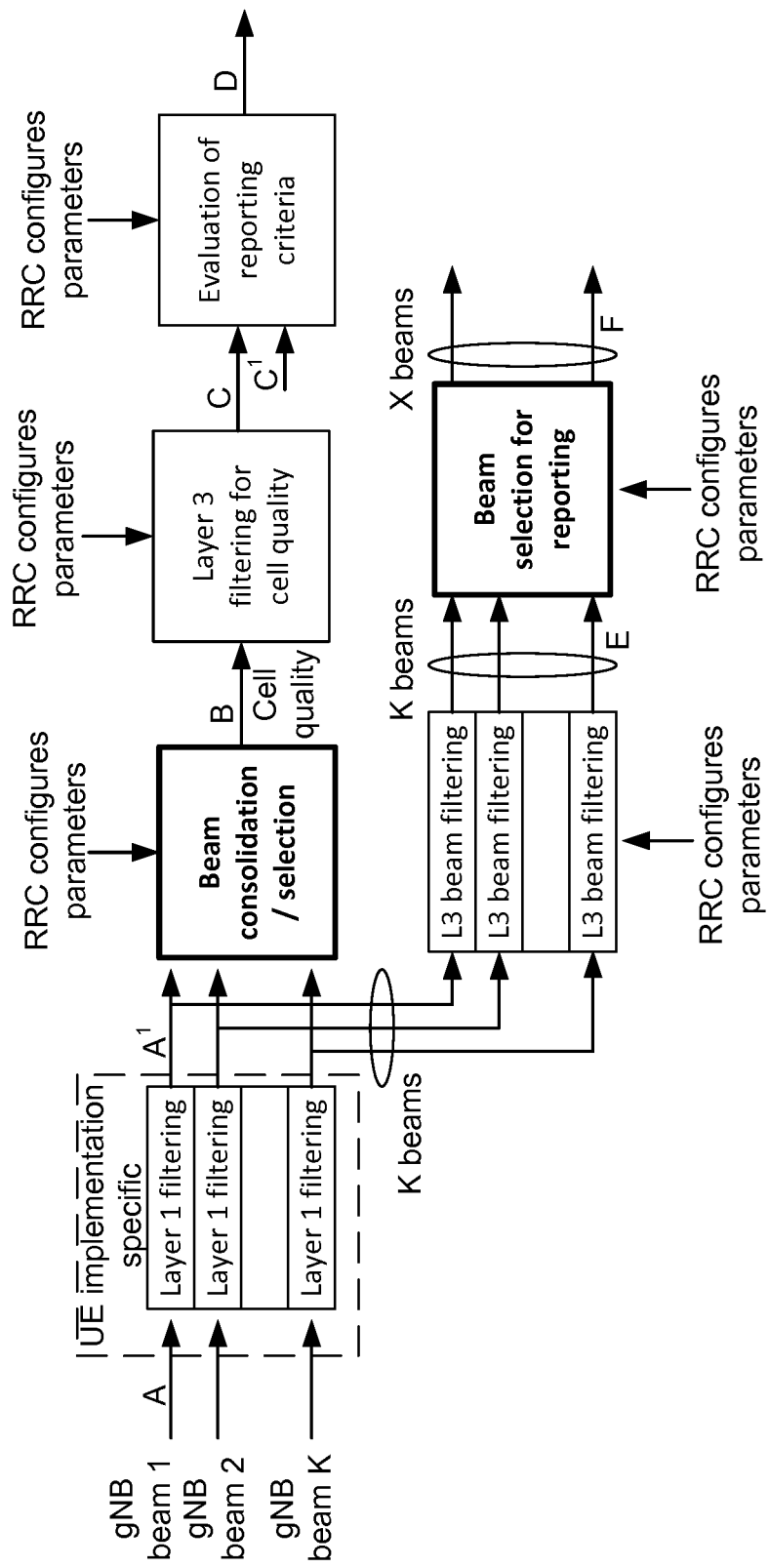
FIG. 4 illustrates an NR measurement model.
Figure 5A:
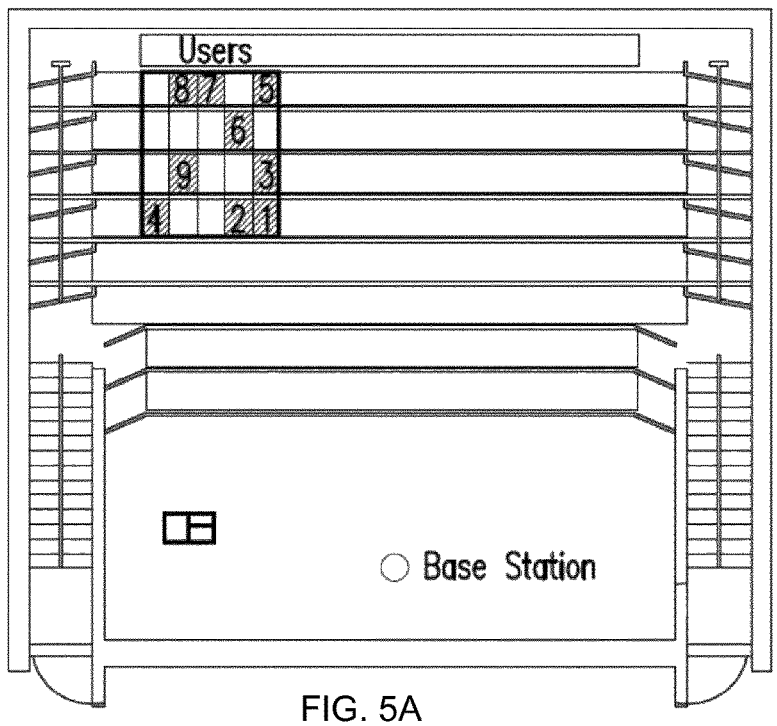
FIGS. 5A and 5B illustrates an arrangement (5A) of UEs and BS corresponding to a channel quality (5B) shown for that arrangement.
Figure 5B:
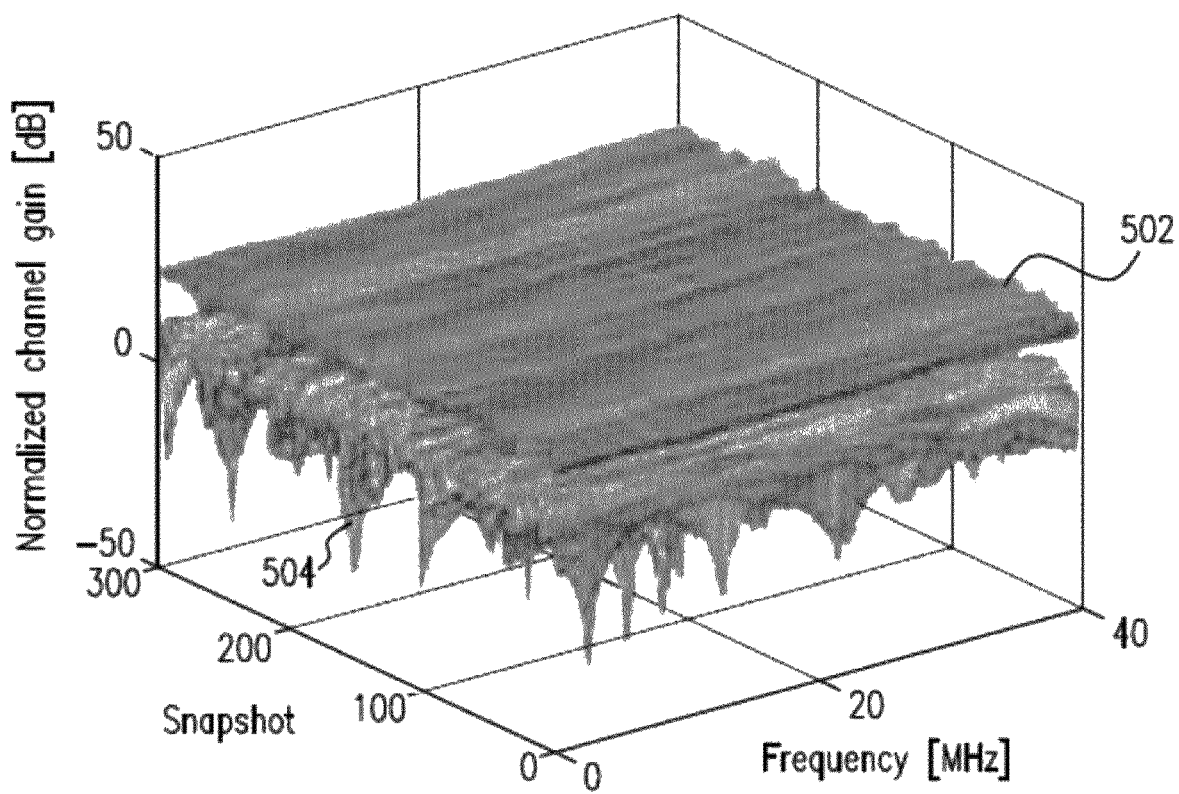
Figure 6A:
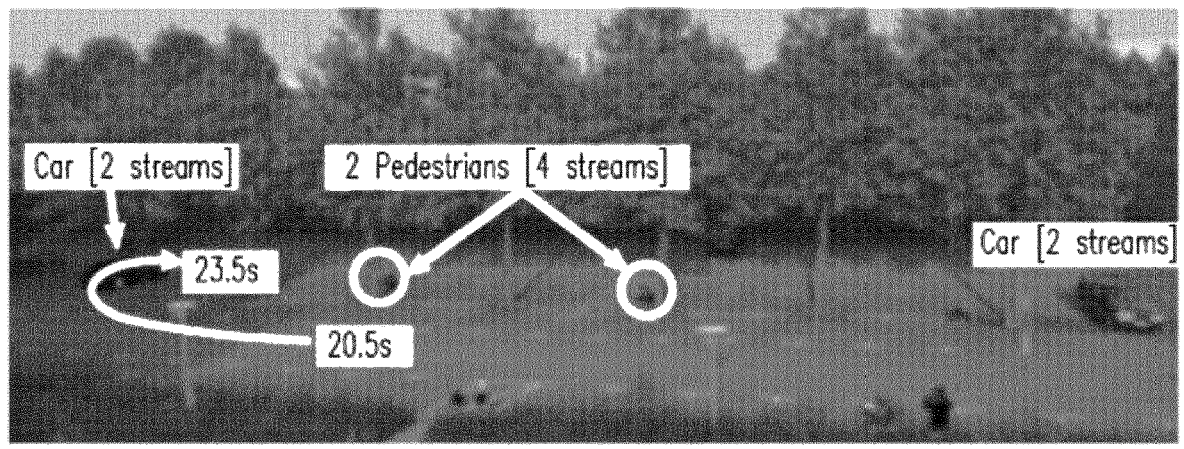
FIGS. 6A and 6B illustrates an arrangement (6A) of UEs and BS corresponding to a channel quality (6B) shown for that arrangement.
Figure 6B:
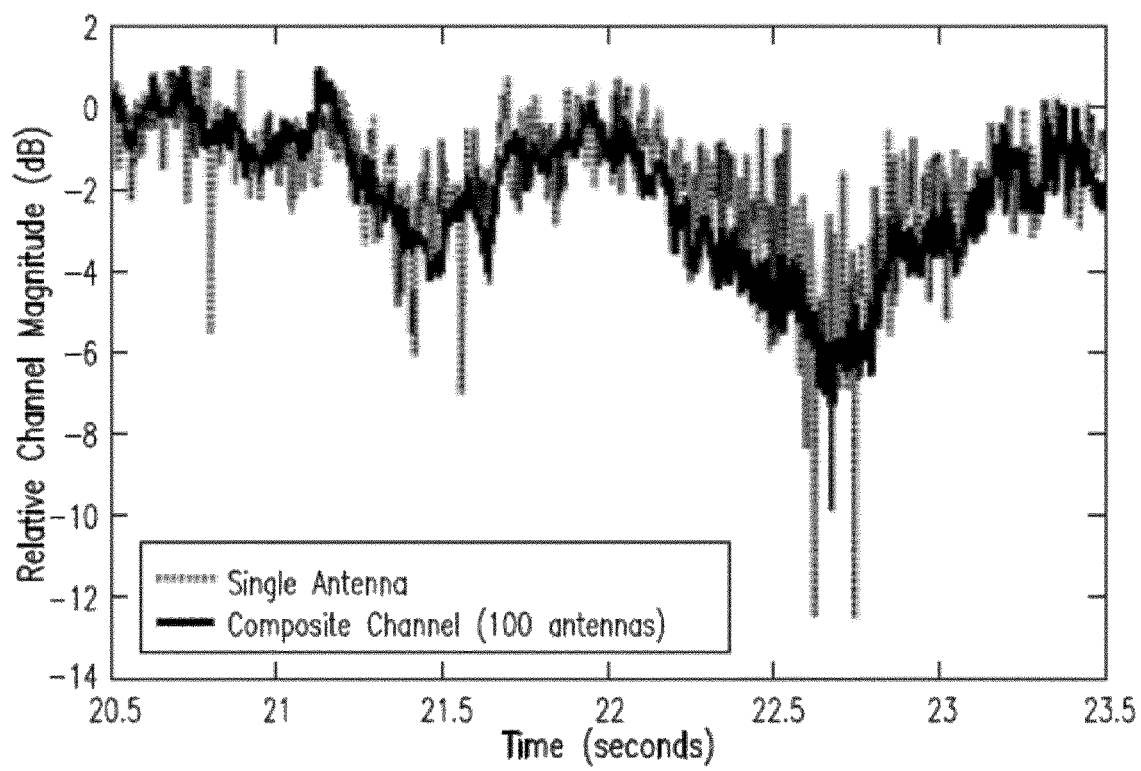

CH is not a new concept however, it has recently acquired new significance since it is expected to occur more frequently in NR than in the previous wireless telecommunication systems, e.g. due to the extensive use of narrow beams in NR, especially in higher frequencies. Most of the previous discussions regarding channel hardening have been limited to the area of massive MIMO or physical layer design. However, upper layer functions based on measurements, such as radio resource allocation and UE mobility management, can also take advantage of CH occurrence and be optimized. For example, a co-owned application describes exploiting the CH effect for reducing the size of a channel quality information (CQI) report used for radio resource allocation. As described there, the UE checks if the CQI of different subbands are similar (which means that the channel is hardened in the frequency domain); and if so, it selects a representative subband and reports only the CQI of this representative subband and a flag indicating that there is CH in the frequency domain. There remain additional areas where the CH effect can be used to optimize performance.

Every time a UE needs to perform a measurement (e.g. create a sample), the UE needs to open its receiver, which consumes battery power. In other words, more frequent measurements consume more power. Hence, it is beneficial, in general, to reduce the periodicity with which the UE obtain measurement samples, as this will improve power performance of the UE. The periodicity may be reduced, for example, either in L1 and/or L3 filtering.

In LTE, for example, there needs to be at least one sample from L1 at every 200 ms in RRC_CONNECTED. But in practice, the L1 itself is generating samples in a much higher pace so that averaging is performed over time and frequency. A similar approach is also adopted in NR, although periodicity and exact requirements may differ. In NR, these L1 samples would be taken per beam, before the beam consolidation function (that takes beam measurements per cell and converts them into cell based quality) and a similar time window would also exist. In the RRC_CONNECTED state, in LTE, for example, the measurement period for intra frequency measurements is 200 ms. That means that the neighbour cell measurements are averaged over a long time period, in the order of 200 ms or even longer, to filter out the effect of small scale fading.

In 5G scenarios, where the reference signals used for RRM measurements (e.g. SS Blocks and/or CSI-RSs) are being transmitted in a radio environment with channel hardening, e.g., due to the fact they are being transmitted using narrow beamforming, the UE's sampling periodicity for measurements may be unnecessarily short since the samples are highly correlated (e.g. in timer and/or frequency). That would lead to an unnecessary battery consumption at the UE. Also, the averaging within the measurement period, e.g., the 200 ms in LTE, is performed to reach a required accuracy by filtering out the effect of small scale fading. However, such small scale fading is negligible when CH is present.

Whether a channel is hardened or not may be referred to as the presence or absence of channel hardening (or CH). Such a CH condition may be measured in different manners. In some embodiments, there may be a binary determination, e.g. occurrence of CH or absence of CH. In other embodiments, there may be a soft metric, e.g. a CH parameter that ranges from 0 to 1, inclusive, or some other set of values. Additionally, a CH condition may vary in different domains, e.g., time domain, frequency domain, or spatial domain, and at different levels of granularity within each such domain. Thus, CH may be present in the time domain, but not present in the frequency domain. Or, as another example, CH may be present for a first frequency, but not present for a second frequency. Or, as another example, the CH condition may depend on a beam or group of beams, e.g. when different beams have a similar measurement quality.

The detection of CH occurrence or absence and the adjustment of measurement parameters based on such detection, according to some embodiments, can be based on at least one or more of the following granularities.

Per frequency/carrier. For example, if the UE is configured to perform measurements on frequencies f1, f2, f3 and the UE detects CH in f2, adjustment of measurement parameters may be applied for measurements on f2, but not necessarily for measurements on f1 or f3. Adjustments may also be performed in a more granular manner e.g. on parts of a given carrier and/or band or sub-band.

Per cell. For example, if the UE is configured to perform measurements on cells c1, c2, c3 and the UE detects CH in c2, adjustment of measurement parameters may be applied for measurements on c2, but not necessarily for measurements on c1 or c3.

Per beam or group of beams. For example, if the UE is configured to perform measurements on beams b1, b2, b3, e.g. beams of a given cell, the UE detects CH in b2, adjustment of measurement parameters may be applied for measurements on b2, but not necessarily for measurements on b1 or b3. Reference signals (e.g. SSB, CSI-RS, etc.) may be understood here as beams.

According to embodiments, adjusting measurement parameters based on a CH parameter may include adjusting parameters such as a measurement period, a sample length, a length of coherent averaging, a measurement bandwidth, a set of reference signals, and a number of beams to average. Examples of adjusting each of these parameters are described below.

Figure 7:
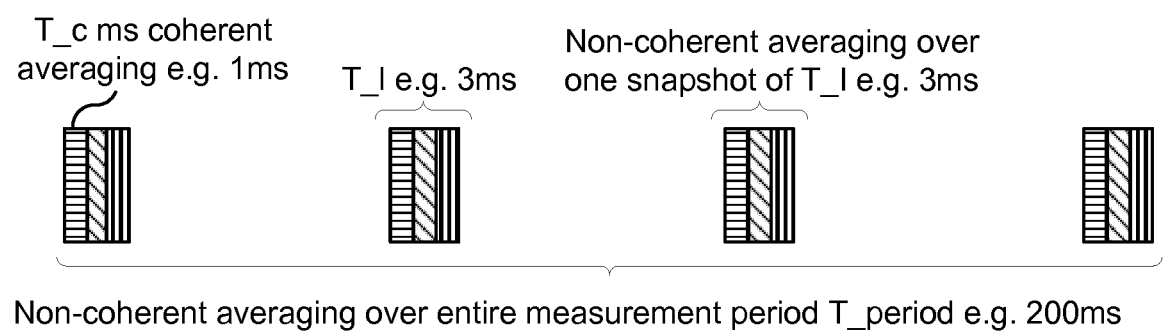
FIG. 7 illustrates non-coherent averaging over a measurement period.

At least one property that may be adjusted is the measurement period. FIG. 7 indicates the measurement period shown as T_period. The UE may change the periodicity upon the detection of channel hardening or its absence. If the UE detects CH occurrence, then the measurement period is increased (i.e. UE is configured to take measurement samples further apart from each other, e.g. 200 ms to 250 ms). Increasing the measurement period in this manner will save UE battery life. This can be done because the CH parameter indicates that there is an increased likelihood that samples will remain within a narrow range over a certain time window so that measurement accuracy is maintained. On the other hand, if the UE detects the absence of CH, then the measurement period is decreased (i.e. UE is configured to take samples closer together). This increases the number of measurements, since the CH parameter here indicates that there is less likelihood that samples will remain within a narrow range. Furthermore, if the UE has already detected the presence or absence of CH, and the current CH parameter has not changed compared to the previous parameter, then the UE may keep the measurement period the same.

At least one property that may be adjusted is the sample length. The UE may change the sampling length upon the detection of channel hardening or its absence. The sample length, for example, may be where the UE performs non-coherent averaging over one snapshot. FIG. 7 indicates the sample length as T_1. If the UE detects CH occurrence, then the sample length is decreased. Decreasing the sample length means that fewer measurements are required. This can be done because the CH parameter indicates that there is an increased likelihood that samples will remain within a narrow range over a certain time window so that measurement accuracy is maintained. On the other hand, if the UE detects the absence of CH, then the sample length is increased. This increases the number of measurements required, since the CH parameter here indicates that there is less likelihood that samples will remain within a narrow range. Furthermore, if the UE has already detected the presence or absence of CH, and the current CH parameter has not changed compared to the previous parameter, then the UE may keep the sample length the same.

At least one property that may be adjusted is the length of coherent averaging. The UE may change the periodicity upon the detection of channel hardening or its absence. The length of coherent averaging, for example, may be where the UE performs non-coherent averaging over one snapshot. FIG. 7 indicates the length of coherent averaging as T_c. The length of coherent averaging may be changed analogously to changing the sample length; that is, decreasing the length of coherent averaging means that fewer measurements are required, whereas increasing the length of coherent averaging means that more measurements are required. If the UE detects CH occurrence, then the length of coherent averaging is decreased. On the other hand, if the UE detects the absence of CH, then the length of coherent averaging is increased. Furthermore, if the UE has already detected the presence or absence of CH, and the current CH parameter has not changed compared to the previous parameter, then the UE may keep the length of coherent averaging the same.

At least one property that is adjusted is the measurement bandwidth (BW) the UE sample measurements. The UE may change the measurement BW upon the detection of channel hardening or its absence. Generally speaking, reducing the measurement BW will reduce the number of measurements required, while increasing it will increase the number of measurements required. If the UE detects CH occurrence, then the measurement BW is decreased. On the other hand, if the UE detects the absence of CH, then the measurement BW is increased. Furthermore, if the UE has already detected the presence or absence of CH, and the current CH parameter has not changed compared to the previous parameter, then the UE may keep the measurement BW the same.

At least one property that may be adjusted are the reference signal(s) that are used for the measurements. In other words, when CH is detected (or depending on the CH level), the UE uses one of a set of reference signals to perform the measurements. The set of RSs may be NR reference signals such as SSBs, Secondary Synchronization Signal(s) (SSS(s)), CSI-RSs, demodulation reference signals (DMRSs), time reference signals (TRSs), etc. For example, when CH is detected, that could be an indication that there is no need to perform too much averaging on the frequency domain to achieve the required accuracy. Hence, the UE may be configured to only use SSSs of the SSBs, and not the DMRSs also transmitted in the SSB. In another example, when CH is detected, that is an indication that there is no need to perform too much averaging on the time domain to achieve the required accuracy. Hence, the UE only uses SSBs (transmitted less often), and not the CSI-RSs. That is, the type of CH condition that is present (e.g. on one or more of time, frequency, spatial domains) may indicate which reference signals can be used, and which can be omitted without sacrificing accuracy, according to some embodiments. If the UE detects CH occurrence, then the set of reference signals used for measurements is decreased. On the other hand, if the UE detects the absence of CH, then the set of reference signals used for measurements is increased. Furthermore, if the UE has already detected the presence or absence of CH, and the current CH parameter has not changed compared to the previous parameter, then the UE may keep the set of reference signals used for measurement the same.

At least one property that may be adjusted is the usage of one or multiple beams to derive the cell quality from multiple beams. The network may configure the UE to perform an average of N beams (where N is configurable) to derive cell quality. If CH occurs in the spatial domain, for example, the UE may use a limited set of beams, assuming that the quality of the other beams remains similar to the quality of the representative beams that are measured. For example, when CH is detected, that is an indication that there is no need to perform too much averaging on the spatial domain to achieve the required accuracy. Hence, in embodiments, the UE may only use a subset of beams to be averaged e.g. the best beam. Alternatively, when CH is not detected, that is an indication that the UE needs to perform beam averaging for the set of N beams for cell quality derivation.

In some embodiments, adjustment of a combination of the measurement parameters (such as the measurement parameters just described) can be used, based on the CH parameter. For example, if CH is present in both the time and frequency domains, then embodiments may adjust one or more time parameters and one or more frequency parameters based on CH being present in those domains.

In some embodiments, RRM measurements refer to RSRP, RSRQ, SINR or metrics that are measured by the UE and possibly reported so that the network may take mobility decisions like handover, release, redirect, etc. These may also be called mobility measurements. They are typically reported in RRC_CONECTED, while in Idle or inactive state they are used for cell selection and cell reselection decision (based on pre-defined rules whose thresholds are provided via system information). Embodiments are applicable to UEs in different protocol states where the UE perform radio measurements, such as: RRC_CONNECTED, RRC_IDLE, RRC_INACTIVE, etc. Measurements may either be performed to support network-based mobility decisions, like handovers (reconfiguration with sync), setup of any form of multi-connectivity (like carrier aggregation, dual connectivity, EN-DC, etc.) or to test the fulfillment of cell reselection criteria. In each case, the UE may adjust one or more measurement parameters based on a CH parameter.

Determining a CH parameter (e.g., detecting the occurrence or absence of a CH condition, or determining a more granular level of CH) may be done in a number of ways, e.g., based on movement detection information, statistical analyses of channel samples, knowledge about the beamforming configuration of the associated signals to be measured, etc. In one embodiment, determining a CH parameter involves recording the last X channel estimations in a sliding window and estimating the standard deviation (STD) of these recorded samples. Then, in embodiments, actions may be performed based on threshold values of the STD, e.g., set new measurement and reporting periodicity based on the STD value. Determining a CH parameter may be performed either at the UE or the network node (e.g. a BS (such as eNB or gNB)). If the network node determines the CH parameter, the network node may signal the CH parameter to the UE.

In some embodiments, a network node (e.g. a BS (such as eNB or gNB) can configure the UE with parameters for report triggering and format, and for allowing the UE to adjust its measurement parameters based on a CH parameter. For example, based on the UE reports, a network node may adapt the transmission of synchronization and reference signals, such as SSBs and CSI-RS. For example, if the network node is aware that the channel of a certain beam for a given UE is hardened, the network may either deactivate the transmission of these reference signals or at least reduce their transmission periodicity.

As used in this disclosure, the term beam should also be interpreted in a broad sense, although most of the time it is used to mean a reference signal that is beamformed with different downlink beam configuration by the network. Examples are CSI-RS resources in the frequency and time domains and SS/PBCH block(s), also called SSBs.

In one embodiment the UE performs periodic measurements with period T_initial to derive the channel quality (which can be in terms of RSRP, RSRQ, SINR, or any other quality metric). Also, what is called channel quality in this context can be the cell quality or beam quality, and may refer to different granularities as described above, like beam, cell, frequency, etc. In this embodiment, the last X measurement samples are recorded in a sliding window. Each time a new sample is generated, the UE calculates the STD of the recorded measurements. Based on the calculated value, the UE can estimate the "degree" of CH. For example, the lower the standard deviation is, the higher the degree of CH over time is. In a variant, a STD threshold can be defined so that if the STD is above that threshold, the UE can consider CH to be detected.

In embodiments, the UE may use information from a movement sensor to update its CH detection. If movement is detected, the UE performs an update of CH estimation. This can improve the UE's ability to accurately determine a CH parameter, since the UE moving can affect channel quality (e.g. moving into a building).

In embodiments, the UE may use information about the beamforming configuration of the reference signals transmitted by the network to detect CH properties, e.g., the degree of channel hardening assuming that narrow beams have higher likelihood to produce the CH effect. This beamforming configuration can be the number of transmitted beams to provide cells coverage (e.g. the number of SSBs per cell) or other physical properties of the beamforming signal.

In embodiments, one or more of the information from a movement sensor, information about beamforming configuration of reference signals, or other information, may be used to determine a CH parameter.

Additional embodiments describing how the UE may use the CH parameter to adjust measurement periodicity are now provided. Measurement periodicity can be the interpreted in different manners, including one or more of the following: as the L1 sampling periodicity for the L1 samples in the measurement model defined in the LTE or NR specifications i.e. per cell measurements; as the L1 sampling periodicity for the L1 samples in the measurement model defined in the NR specification i.e. per beam; as the L3 measurement period in the measurement model defined in the LTE or NR specification i.e. per cell; and as the L3 measurement period in the measurement model defined in the LTE or NR specification i.e. per beam.

In an embodiment, the UE may execute pre-defined actions based on channel hardening, e.g., adapt channel measurement/reporting periodicity.

Figure 8:
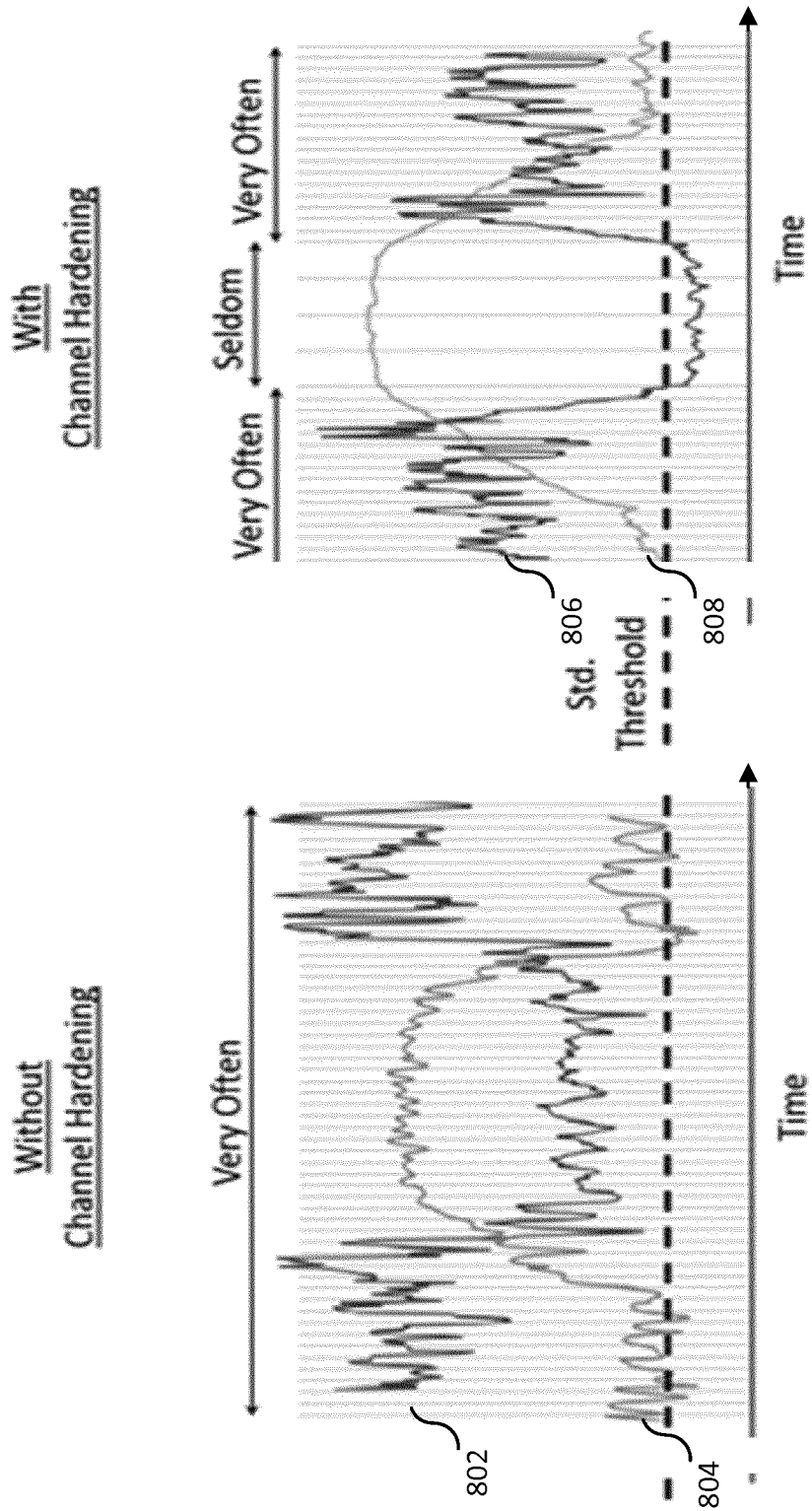
FIG. 8 illustrates UE measurements with and without channel hardening according to some embodiments.

FIG. 8 illustrates UE measurements with or without channel hardening, according to an embodiment. Two charts are shown, with and without CH. The curves 804 and 808 represent signal strengths and the curves 802 and 806 represent the standard deviation, STD, related to these signals. The vertical lines show the time instants in which the UE performs a new measurement (shown as either being "very often" as indicated by tightly-spaced lines or as "seldom" as indicated by lines that are more spread out). In this example, if the STD is lower than a given threshold (indicated by the dashed horizontal line labeled "Std. Threshold"), then CH is determined to be present. In that case, for at least a few instants of time (e.g. the Time-To-Trigger (TTT) in a handover procedure), the UE is allowed to adjust the measurement periodicity from very often to seldom, as illustrated in the "With Channel Hardening" chart.

Table 1 presents an example of possible STD thresholds and actions related to them. If STD is lower than a first threshold (here 0.3 dBm), e.g., the channel fluctuations are low, then the L1 measurement periodicity may be set equal to 160 ms. If the STD is higher than a second threshold (here 0.8 dBm), e.g., the channel fluctuations are high, then the L1 measurement periodicity can be set equal to its default value, e.g., 20 ms. For intermediary values of STD between the first and second threshold values, the L1 measurement periodicity can be set equal to 80 ms. In embodiments, there may be more threshold values with correspondingly incremental actions taken. Additionally, in embodiments the action may involve a function (e.g. a step-wise and/or continuous function) of the STD value, e.g. the action may be to set the L1 measurement period as a function (e.g. a step-wise and/or continuous function) of STD.

TABLE 1

| STANDARD DEVIATION VALUE | ACTION |
| --- | --- |
| <0.3 dBm | Set L1 measurement period equal to 160 ms |
| ≥0.3 dBm and <0.8 dBm | Set L1 measurement period equal to 80 ms |
| ≥0.8 dBm | Set L1 measurement period equal to 20 ms |

Table 2 presents another example of possible STD thresholds and actions related to them. In this case, the UE shall scale the corresponding cell/beam's measurement property (e.g., periodicity/length of measurement, etc.) based on the scaling factor configured by the network for the hardened channel. Thus, the network configures different scaling factors per soft CH metric level defined. This is in principle similar to speed based scaling of mobility parameters in LTE. As shown below, if STD is lower than a first threshold (here 0.3 dBm), e.g., the channel fluctuations are low, then the configured periodicity value is multiplied by 8. If the STD is higher than a second threshold (here 0.8 dBm), e.g., the channel fluctuations are high, then the configured periodicity value is unchanged. For intermediary values of STD between the first and second threshold values, the configured periodicity is multiplied by 4. In embodiments, there may be more threshold values with correspondingly incremental actions taken. Additionally, in embodiments the action may involve a function (e.g. a step-wise and/or continuous function) of the STD value, e.g. the action may be to set the L1 measurement period as a function (e.g. a step-wise and/or continuous function) of STD.

TABLE 2

| STANDARD DEVIATION VALUE | ACTION |
| --- | --- |
| <0.3 dBm | Multiply the configured periodicity value by 8 |
| ≥0.3 dBm and <0.8 dBm | Multiply the configured periodicity value by 4 |
| ≥0.8 dBm | Use of the periodicity as configured |

In another embodiment, the value of X, i.e., number of samples recorded in the sliding window to compute the STD, may vary based on the configured measurement period. The STD may depend on the value of X. If there is a large window, a new sample may have a diminished impact on the STD. In this case, a high measurement period may not react fast enough to sudden drops in the signal quality, since it would take a longer time until there are enough measurements (due to the longer measurement period) to produce an important change in the STD. To overcome this possible issue, in embodiments there may be a decrease in the window size to correspond to increasing the measurement period. A shorter window size would counterbalance the higher measurement period and fewer samples would be necessary to detect when the signal fluctuations increase, thereby allowing the UE to react faster to this change.

In addition to UE-related embodiments, there are also embodiments directed to network actions, such as actions that a network node (e.g. BS) may take.

In embodiments, the BS (or other network node) may signal to the UE, e.g. via control channel such as by using a flag (e.g., ChHardFlag), whether the UE is permitted (or even required) to perform optimizations based on a CH parameter. For example, if ChHardFlag is set equal to FALSE, the UE should follow some specific legacy measurement or reporting mode to just measure and report channel quality values as configured, and not to carry out any further action regarding channel hardening detection or measurement adaptation. This way, all the advanced operations/computations would be left to BS side and from UE side, it would be transparent. Alternatively, the BS may set ChHardFlag equal to TRUE, thereby permitting the UE to perform one or more of the embodiments disclosed herein.

In embodiments, the BS (or other network node) signals to the UE whether the UE is permitted (or even required) to perform optimizations based on a CH parameter on a granular level such as per frequency/carrier/band, per cell, per beam or group of beams, or per reference signal.

In embodiments, the BS (or other network node) may reduce SSB and CSI-RS transmissions if it knows that the UEs are set to measure them with a higher measurement periodicity. That may reduce interference and make the system leaner, as the network can take actions based on the UE reported periodicity, such as reducing SSBs and CSI-RS transmissions if UEs are set (based on configuration) to not measuring them. In other words, when the network knows that the UE is using longer periods because of CH, the network may also transmit some reference signals within these longer periods.

In embodiments, the detection of CH and/or a CH parameter may also be reported to the network (such as to a network node e.g. a BS) so that the network can adjust the periodicity of reference signals used for channel quality measurements. For example, if network is aware that time domain CH is present, then the network may adjust the transmission periodicity of these RSs for that particular UE.

In embodiments, the BS (or other network node) collects statistics regarding CH detection and/or CH parameters. The BS (or other network node) may also, based on such statistics, adjust measurement parameters and indicate these adjusted parameters to one or more UEs via signaling.

Figure 9:
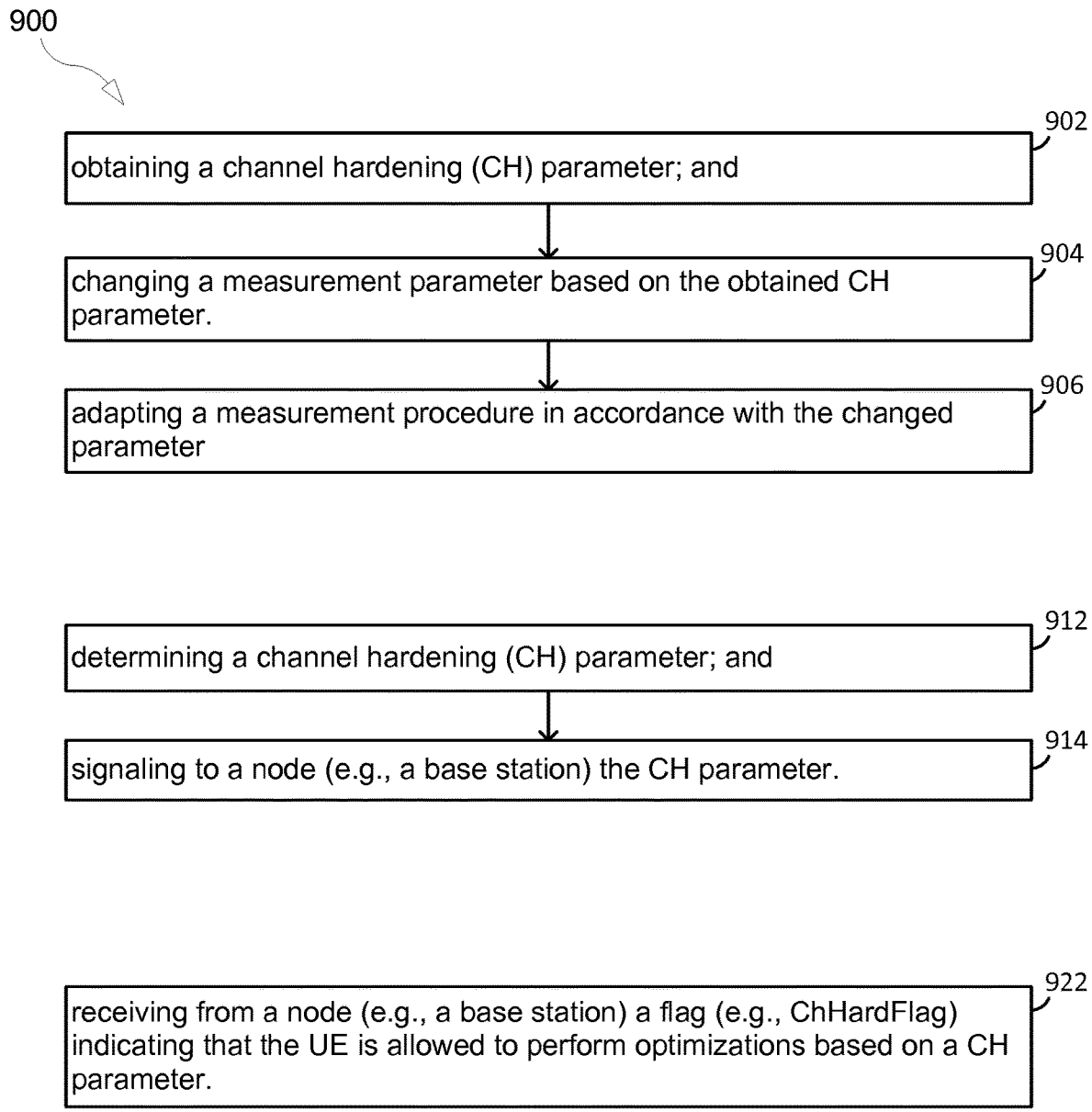
FIG. 9 is a flow chart illustrating a process according to some embodiments.

FIG. 9 is a flow chart according to one or more embodiments.

Process 900 is a method, performed by a UE. The method includes obtaining a channel hardening (CH) parameter (step 902); and changing (step 904) a measurement parameter based on the obtained CH parameter. In some examples the measurement parameter is for measuring a quantity such as a signal strength or power level based on the determined CH parameter (step 904). In some examples the obtaining a CH parameter comprises the UE determining the CH parameter itself, as described in more detail below. In some embodiments the method includes adapting (step 906) a measurement procedure in accordance with the changed parameter.

In some embodiments, the measurement procedure is a radio resource management (RRM) procedure which involves measuring a quantity. In other words, the measured quantity is a radio resource management (RRM) measurement including one or more of a channel quality indicator (CQI), a reference signal received power (RSRP), a reference signal received quality (RSRQ), and a carrier received signal strength indicator (RSSI). In some embodiments, the measurement parameter is selected from the group consisting of a measurement period, a sample length, a length of coherent averaging, a measurement bandwidth, a set of reference signals, and a number of beams to average.

In embodiments, obtaining the CH parameter comprises obtaining an indication that a CH condition is present and as a result of the CH condition being present, changing the measurement parameter. In some embodiments, this is achieved by determining that a CH condition is present and as a result of the CH condition being present, changing the measurement parameter. In some embodiments, determining that the CH condition is present comprises determining that the CH parameter is less than a first CH threshold. In embodiments, the method further includes, as a result of determining that the CH condition is present, periodically changing the measurement parameter for measuring the quantity based on the obtained CH parameter; in further embodiments, the method may include determining that the CH condition is not present and, as a result of determining that the CH condition is not present, ceasing to periodically change the measurement parameter for measuring the quantity based on the determined CH parameter.

In some embodiments, changing a measurement parameter for measuring the quantity based on the obtained CH parameter comprises determining that a CH condition is not present and as a result of the CH condition not being present, changing the measurement parameter. In some embodiments, determining that the CH condition is not present comprises determining that the CH parameter exceeds a second CH threshold.

In some embodiments, obtaining the CH parameter comprises determining a first CH parameter for a first frequency and/or carrier and/or band and a second CH parameter for a second frequency and/or carrier and/or band; and changing the measurement parameter for measuring the quantity based on the obtained CH parameter comprises changing the measurement parameter for measuring the quantity on the first frequency and/or carrier and/or band based on the determined first CH parameter and not changing the measurement parameter for measuring the quantity on the second frequency and/or carrier and/or band based on the determined second CH parameter. In some embodiments, obtaining the CH parameter comprises determining a first CH parameter for a first cell and a second CH parameter for a second cell; and changing the measurement parameter for measuring the quantity based on the obtained parameter comprises changing the measurement parameter for measuring the quantity on the first cell and/or band based on the determined first CH parameter and not changing the measurement parameter for measuring the quantity on the second cell based on the determined second CH parameter.

In some embodiments, obtaining the CH parameter comprises determining a first CH parameter for a first beam and/or group of beams and a second CH parameter for a second beam and/or group of beams; and changing the measurement parameter for measuring the quantity based on the obtained CH parameter comprises changing the measurement parameter for measuring the quantity on the first beam and/or group of beams and/or band based on the determined first CH parameter and not changing the measurement parameter for measuring the quantity on the second beam and/or group of beams based on the determined second CH parameter. In some embodiments, changing a measurement parameter for measuring the quantity based on the obtained CH parameter comprises increasing a measurement period because the CH parameter is less than a threshold. In embodiments, changing a measurement parameter for measuring the quantity based on the obtained CH parameter comprises decreasing a measurement period because the CH parameter exceeds a threshold.

In some embodiments, changing a measurement parameter for measuring the quantity based on the obtained CH parameter comprises decreasing a sample length for performing non-coherent averaging because the CH parameter is less than a threshold. In embodiments, changing a measurement parameter for measuring the quantity based on the obtained CH parameter comprises increasing a sample length for performing non-coherent averaging because the CH parameter exceeds a threshold. In some embodiments, changing a measurement parameter for measuring the quantity based on the obtained CH parameter comprises decreasing a length of coherent averaging because the CH parameter is less than a threshold.

In some embodiments, changing a measurement parameter for measuring the quantity based on the obtained CH parameter comprises increasing a length of coherent averaging because the CH parameter exceeds a threshold. In embodiments, changing a measurement parameter for measuring the quantity based on the obtained CH parameter comprises reducing a measurement bandwidth because the CH parameter is less than a threshold. In some embodiments, changing a measurement parameter for measuring the quantity based on the obtained CH parameter comprises increasing a measurement bandwidth because the CH parameter exceeds a threshold. In some embodiments, changing a measurement parameter for measuring the quantity based on the obtained CH parameter comprises setting a reference signal parameter because the CH parameter is less than a threshold, such that the reference signal parameter indicates to only use secondary synchronization signals (SSSs) from a synchronization signal block (SSB), and not to use demodulation reference signals (DMRSs) from the SSB.

In some embodiments, changing a measurement parameter for measuring the quantity based on the obtained CH parameter comprises setting a reference signal parameter because the CH parameter is less than a threshold, such that the reference signal parameter indicates to only use reference signals from a synchronization signal block (SSB), and not to use channel state information reference signals (CSI-RSs). In some embodiments, changing a measurement parameter for measuring the quantity based on the obtained CH parameter comprises reducing a set of beams for deriving cell quality because the CH parameter is less than a threshold. In embodiments, changing a measurement parameter for measuring the quantity based on the obtained CH parameter comprises increasing a set of beams for deriving cell quality because the CH parameter exceeds a threshold. In some embodiments, the CH parameter is a binary value that indicates either the presence or absence of a CH condition; in other embodiments, the CH parameter is an analog value that indicates a degree of a CH condition.

In some embodiments, obtaining a channel hardening (CH) parameter comprises: recording a set of previous channel estimations in a sliding window; estimating a standard deviation from the recorded set; and assigning the CH parameter based on the estimated standard deviation. In some embodiments, assigning the CH parameter based on the estimated standard deviation comprises assigning a parameter indicating the presence of a CH condition if the standard deviation is less than a first threshold (e.g., 0.8 dBm) and assigning a parameter indicating the absence of a CH condition if the standard deviation is greater than or equal to the first threshold (e.g., 0.8 dBm). In embodiments, assigning the CH parameter based on the estimated standard deviation comprises assigning a parameter indicating the presence of a strong CH condition if the standard deviation is less than a first threshold (e.g., 0.3 dBm), assigning a parameter indicating the presence of a weak CH condition if the standard deviation is between the first threshold and a second threshold (e.g., 0.8 dBm), and assigning a parameter indicating the absence of a CH condition if the standard deviation is greater than or equal to the second threshold (e.g., 0.8 dBm).

In some embodiments, the method further includes signaling to a network node (e.g., a base station) the CH parameter. In some embodiments, the method further includes receiving from a network node (e.g., a base station) an indication (e.g., ChHardFlag) indicating that the UE is allowed to perform optimizations based on the CH parameter.

In some examples a method comprises determining a channel hardening (CH) parameter (step 912); and signaling to a node (e.g., a base station) the CH parameter (step 914).

In some examples a method comprises receiving from a network node (e.g., a base station) an indication (e.g., ChHardFlag) indicating that the UE is allowed to perform optimizations based on a CH parameter (step 922).

Figure 10:
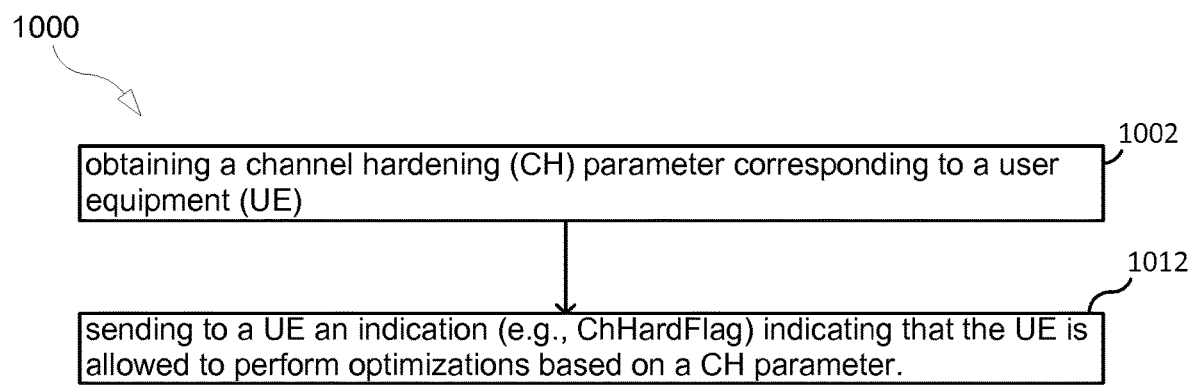
FIG. 10 is a flow chart illustrating a process according to some embodiments.

FIG. 10 is a flow chart according to one or more embodiments.

Process 1000 is a method, performed by a node (e.g., a base station). The method includes obtaining a channel hardening (CH) parameter (step 1002). The CH parameter corresponds to a user equipment (UE) and in some examples is received from the user equipment (UE). In other examples the CH parameter may be signaled to the UE. In some embodiments, the method further includes collecting statistics regarding CH conditions at the UE. In some embodiments, the method, optionally, further includes sending (step 1012) to the UE an indication (e.g., ChHardFlag) indicating that the UE is allowed to perform optimizations based on the CH parameter. In some embodiments, the indication further indicates a granularity at which the UE is allowed to perform optimizations based on the CH parameter. In some embodiments, the granularity is per frequency and/or per carrier and/or per band; the granularity is per cell; the granularity is per beam and/or group of beams; and/or the granularity is per reference signal.

In some embodiments, the method further includes adapting transmission of synchronization and reference signals based on the received CH parameter. In some embodiments, adapting transmission of synchronization and reference signals based on the received CH parameter comprises reducing transmission of synchronization signal blocks (SSBs) and channel state information reference signals (CSI-RSs) based on the UE being in a CH condition.

Figure 11:
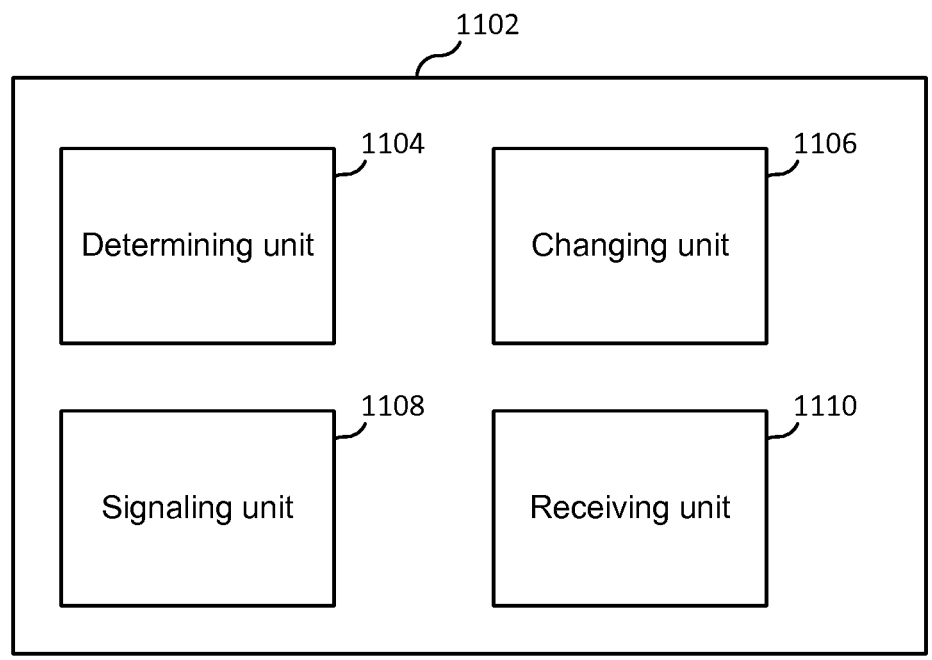
FIG. 11 is a diagram showing functional units of a UE according to some embodiments.

FIG. 11 is a diagram showing functional units of UE 1102, according to an embodiment. UE 1102 includes one or more of a determining unit 1104, a changing unit 1106, a signaling unit 1108, and a receiving unit 1110.

In embodiments, the determining unit 1104 is configured to obtain a channel hardening (CH) parameter; and changing unit 1106 is configured to change a measurement parameter for measuring a quantity based on the obtained CH parameter.

In embodiments, determining unit 1104 is further configured to determine a channel hardening (CH) parameter; and signaling unit 1108 is configured to signal to a node (e.g., a base station) the CH parameter.

In embodiments, receiving unit 1110 is configured to receive from a network node (e.g., a base station) an indication (e.g., ChHardFlag) indicating that the UE is allowed to perform optimizations based on a CH parameter (step 922).

Figure 12:
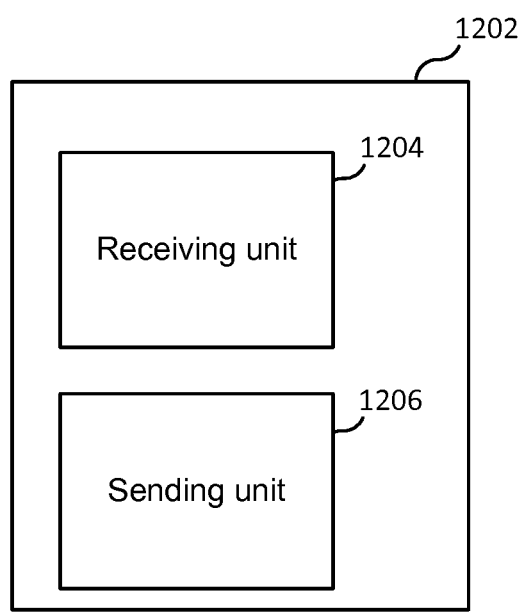
FIG. 12 is a diagram showing functional units of a network node according to some embodiments.

FIG. 12 is a diagram showing functional units of network node 1202 (such as a BS e.g. eNB or gNB), according to an embodiment. Node 1202 includes one or more of a receiving unit 1204 and a sending unit 1206.

In embodiments, receiving unit 1204 is configured to receive from a user equipment (UE) a channel hardening (CH) parameter.

In embodiments, sending unit 1206 is configured to send to a UE an indication (e.g., ChHardFlag) indicating that the UE is allowed to perform optimizations based on a CH parameter.

Figure 13:
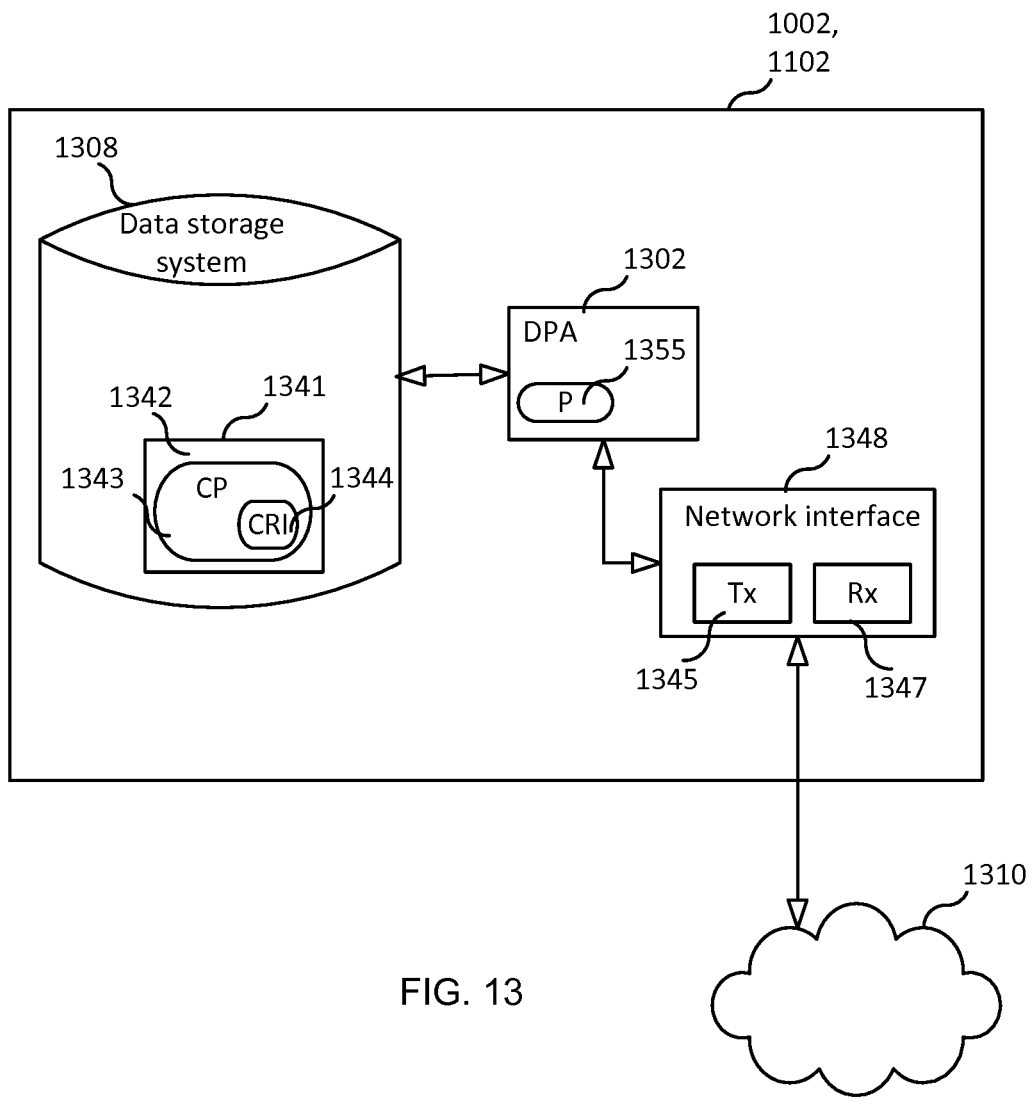
FIG. 13 is a block diagram of a UE and/or network node according to some embodiments.

FIG. 13 is a block diagram of UE 1102 and/or network node 1202, according to some embodiments. UE 1102 and/or network node 1202 may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like); a network interface 1348 comprising a transmitter (Tx) 1345 and a receiver (Rx) 1347 for enabling UE 1102 and/or network node 1202 to transmit data to and receive data from other nodes connected to a network 1310 (e.g., an Internet Protocol (IP) network) to which network interface 1348 is connected; and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes UE 1102 and/or network node 1202 to perform steps described herein (e.g., steps described herein with reference to the flow charts). In other embodiments, UE 1102 and/or network node 1202 may be configured to perform steps described herein without the need for code. That is, for example, PC 1302 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The following enumerated embodiments provide further examples in support of the present disclosure.

A1. A method, performed by a user equipment (UE), the method comprising:
  determining a channel hardening (CH) parameter; and
  changing a measurement parameter for measuring a quantity based on the determined CH parameter.

A2. The method of embodiment A1, wherein the measured quantity is a radio resource management (RRM) measurement including one or more of a channel quality indicator (CQI), a reference signal received power (RSRP), a reference signal received quality (RSRQ), and a carrier received signal strength indicator (RSSI).

A3. The method of any one of embodiments A1-A2, wherein the measurement parameter is selected from the group consisting of a measurement period, a sample length, a length of coherent averaging, a measurement bandwidth, a set of reference signals, and a number of beams to average.

A4. The method of any one of embodiments A1-A3, wherein changing a measurement parameter for measuring the quantity based on the determined CH parameter comprises determining that a CH condition is present and as a result of the CH condition being present, changing the measurement parameter.

A5. The method of embodiment A4, wherein determining that the CH condition is present comprises determining that the CH parameter is less than a first CH threshold.

A6. The method of any one of embodiments A3-A4, further comprising, as a result of determining that the CH condition is present, periodically changing the measurement parameter for measuring the quantity based on the determined CH parameter.

A7. The method of embodiment A6, further comprising determining that the CH condition is not present and, as a result of determining that the CH condition is not present, ceasing to periodically change the measurement parameter for measuring the quantity based on the determined CH parameter.

A8. The method of any one of embodiments A1-A3, wherein changing a measurement parameter for measuring the quantity based on the determined CH parameter comprises determining that a CH condition is not present and as a result of the CH condition not being present, changing the measurement parameter.

A9. The method of embodiment A8, wherein determining that the CH condition is not present comprises determining that the CH parameter exceeds a second CH threshold.

A10. The method of any one of embodiments A1-A9, wherein:
  determining the CH parameter comprises determining a first CH parameter for a first frequency and/or carrier and/or band and a second CH parameter for a second frequency and/or carrier and/or band; and
  changing the measurement parameter for measuring the quantity based on the determined CH parameter comprises changing the measurement parameter for measuring the quantity on the first frequency and/or carrier and/or band based on the determined first CH parameter and not changing the measurement parameter for measuring the quantity on the second frequency and/or carrier and/or band based on the determined second CH parameter.

A11. The method of any one of embodiments A1-A10, wherein:
  determining the CH parameter comprises determining a first CH parameter for a first cell and a second CH parameter for a second cell; and
  changing the measurement parameter for measuring the quantity based on the determined CH parameter comprises changing the measurement parameter for measuring the quantity on the first cell and/or band based on the determined first CH parameter and not changing the measurement parameter for measuring the quantity on the second cell based on the determined second CH parameter.

A12. The method of any one of embodiments A1-A11, wherein:
  determining the CH parameter comprises determining a first CH parameter for a first beam and/or group of beams and a second CH parameter for a second beam and/or group of beams; and
  changing the measurement parameter for measuring the quantity based on the determined CH parameter comprises changing the measurement parameter for measuring the quantity on the first beam and/or group of beams and/or band based on the determined first CH parameter and not changing the measurement parameter for measuring the quantity on the second beam and/or group of beams based on the determined second CH parameter.

A13. The method of any one of embodiments A1-A12, wherein changing a measurement parameter for measuring the quantity based on the determined CH parameter comprises increasing a measurement period because the CH parameter is less than a threshold.

A14. The method of any one of embodiments A1-A12, wherein changing a measurement parameter for measuring the quantity based on the determined CH parameter comprises decreasing a measurement period because the CH parameter exceeds a threshold.

A15. The method of any one of embodiments A1-A14, wherein changing a measurement parameter for measuring the quantity based on the determined CH parameter comprises decreasing a sample length for performing non-coherent averaging because the CH parameter is less than a threshold.

A16. The method of any one of embodiments A1-A14, wherein changing a measurement parameter for measuring the quantity based on the determined CH parameter comprises increasing a sample length for performing non-coherent averaging because the CH parameter exceeds a threshold.

A17. The method of any one of embodiments A1-A16, wherein changing a measurement parameter for measuring the quantity based on the determined CH parameter comprises decreasing a length of coherent averaging because the CH parameter is less than a threshold.

A18. The method of any one of embodiments A1-A16, wherein changing a measurement parameter for measuring the quantity based on the determined CH parameter comprises increasing a length of coherent averaging because the CH parameter exceeds a threshold.

A19. The method of any one of embodiments A1-A18, wherein changing a measurement parameter for measuring the quantity based on the determined CH parameter comprises reducing a measurement bandwidth because the CH parameter is less than a threshold.

A20. The method of any one of embodiments A1-A18, wherein changing a measurement parameter for measuring the quantity based on the determined CH parameter comprises increasing a measurement bandwidth because the CH parameter exceeds a threshold.

A21. The method of any one of embodiments A1-A20, wherein changing a measurement parameter for measuring the quantity based on the determined CH parameter comprises setting a reference signal parameter because the CH parameter is less than a threshold, such that the reference signal parameter indicates to only use secondary synchronization signals (SSSs) from a synchronization signal block (SSB), and not to use demodulation reference signals (DMRSs) from the SSB.

A22. The method of any one of embodiments A1-A21, wherein changing a measurement parameter for measuring the quantity based on the determined CH parameter comprises setting a reference signal parameter because the CH parameter is less than a threshold, such that the reference signal parameter indicates to only use reference signals from a synchronization signal block (SSB), and not to use channel state information reference signals (CSI-RSs).

A23. The method of any one of embodiments A1-A22, wherein changing a measurement parameter for measuring the quantity based on the determined CH parameter comprises reducing a set of beams for deriving cell quality because the CH parameter is less than a threshold.

A24. The method of any one of embodiments A1-A22, wherein changing a measurement parameter for measuring the quantity based on the determined CH parameter comprises increasing a set of beams for deriving cell quality because the CH parameter exceeds a threshold.

A25. The method of any one of embodiments A1-A24, wherein the CH parameter is a binary value that indicates either the presence or absence of a CH condition.

A26. The method of any one of embodiments A1-A24, wherein the CH parameter is an analog value that indicates a degree of a CH condition.

A27. The method of any one of embodiments A1-A26, wherein determining a channel hardening (CH) parameter comprises:
  recording a set of previous channel estimations in a sliding window;
  estimating a standard deviation from the recorded set; and
  assigning the CH parameter based on the estimated standard deviation.

A26. The method of embodiment A25, wherein assigning the CH parameter based on the estimated standard deviation comprises assigning a parameter indicating the presence of a CH condition if the standard deviation is less than a first threshold (e.g., 0.8 dBm) and assigning a parameter indicating the absence of a CH condition if the standard deviation is greater than or equal to the first threshold (e.g., 0.8 dBm).

A27. The method of embodiment A25, wherein assigning the CH parameter based on the estimated standard deviation comprises assigning a parameter indicating the presence of a strong CH condition if the standard deviation is less than a first threshold (e.g., 0.3 dBm), assigning a parameter indicating the presence of a weak CH condition if the standard deviation is between the first threshold and a second threshold (e.g., 0.8 dBm), and assigning a parameter indicating the absence of a CH condition if the standard deviation is greater than or equal to the second threshold (e.g., 0.8 dBm).

A28. The method of any one of embodiments A1-A27, further comprising signaling to a node (e.g., a base station) the CH parameter.

A29. The method of any one of embodiments A1-A28, further comprising receiving from a node (e.g., a base station) a flag (e.g., ChHardFlag) indicating that the UE is allowed to perform optimizations based on the CH parameter.

B1. A method, performed by a user equipment (UE), the method comprising:
  determining a channel hardening (CH) parameter; and
  signaling to a node (e.g., a base station) the CH parameter.

C1. A method, performed by a user equipment (UE), the method comprising:
  receiving from a node (e.g., a base station) a flag (e.g., ChHardFlag) indicating that the UE is allowed to perform optimizations based on a CH parameter.

D1. A method, performed by a node (e.g., a base station), the method comprising:
  receiving from a user equipment (UE) a channel hardening (CH) parameter.

D2. The method of embodiment D1, further comprising collecting statistics regarding CH conditions at the UE.

D3. The method of any one of embodiments D1-D2, further comprising sending to the UE a flag (e.g., ChHardFlag) indicating that the UE is allowed to perform optimizations based on the CH parameter.

D4. The method of any one of embodiments D1-D3, further comprising adapting transmission of synchronization and reference signals based on the received CH parameter.

D5. The method of embodiment D4, wherein adapting transmission of synchronization and reference signals based on the received CH parameter comprises reducing transmission of synchronization signal blocks (SSBs) and channel state information reference signals (CSI-RSs) based on the UE being in a CH condition.

E1. A method, performed by a node (e.g., a base station), the method comprising:
  sending to a UE a flag (e.g., ChHardFlag) indicating that the UE is allowed to perform optimizations based on a CH parameter.

E2. The method of embodiment E1, wherein the flag further indicates a granularity at which the UE is allowed to perform optimizations based on the CH parameter.

E3. The method of embodiment E2, wherein the granularity is per frequency and/or per carrier and/or per band.

E4. The method of any one of embodiments E2-E3, wherein the granularity is per cell.

E5. The method of any one of embodiments E2-E4, wherein the granularity is per beam and/or group of beams.

E6. The method of any one of embodiments E2-E5, wherein the granularity is per reference signal.

F1. A user equipment (UE) adapted to perform any of the embodiments of A1-A29.

F2. A user equipment (UE) adapted to perform the embodiment of B1.

F3. A user equipment (UE) adapted to perform the embodiment of C1.

G1. A user equipment (UE), the UE comprising:
  a determining unit configured to determine a channel hardening (CH) parameter; and
  a changing unit configured to change a measurement parameter for measuring a quantity based on the determined CH parameter.

G2. A user equipment (UE), the UE comprising:
  a determining unit configured to determine a channel hardening (CH) parameter; and
  a signaling unit configured to signal to a node (e.g., a base station) the CH parameter.

G3. A user equipment (UE), the UE comprising:
  a receiving unit configured to receive from a node (e.g., a base station) a flag (e.g., ChHardFlag) indicating that the UE is allowed to perform optimizations based on a CH parameter.

H1. A network node (e.g. base station (BS)) adapted to perform any of the embodiments of D1-D5.

H2. A network node (e.g. base station (BS)) adapted to perform any one of the embodiments of E1-E6.

I1. A network node (e.g. base station (BS)), the network node comprising:
  a receiving unit configured to receive from a user equipment (UE) a channel hardening (CH) parameter.

I2. A network node (e.g. base station (BS)), the network node comprising:
  a sending unit configured to send to a UE a flag (e.g., ChHardFlag) indicating that the UE is allowed to perform optimizations based on a CH parameter.

J1. A computer program comprising instructions which when executed by processing circuitry of a node causes the node to perform the method of any one of embodiments A1-A29, B1, C1, D1-D5, and E1-E6.

J2. A carrier containing the computer program of claim J1, wherein the carrier is one of an electronic signal, an optical signal, a radio signal, and a computer readable storage medium.

The invention claimed is:

1. A method, performed by a user equipment (UE), the method comprising:
  obtaining an indication that a channel hardening (CH) condition is present;
  based on the indication that the CH condition is present, obtaining a CH parameter;
  determining that the obtained CH parameter is less than a first CH threshold;
  in response to determining that the obtained CH parameter is less than the first CH threshold, changing a measurement parameter based on the obtained CH parameter; and
  adapting a measurement procedure in accordance with the changed measurement parameter.

2. The method of claim 1, wherein the measurement procedure is a radio resource management (RRM) measurement which involves measuring a quantity including one or more of a channel quality indicator (COI), a reference signal received power (RSRP), a reference signal received quality (RSRQ), and a carrier received signal strength indicator (RSSI).

3. The method of claim 1, wherein the measurement parameter is selected from the group consisting of a measurement period, a sample length, a length of coherent averaging, a measurement bandwidth, a set of reference signals, and a number of beams to average.

4. The method of claim 1, further comprising, as a result of obtaining the indication that the CH condition is present, periodically changing the measurement parameter based on the obtained CH parameter.

5. The method of claim 4, further comprising determining that the CH condition is not present and, as a result of determining that the CH condition is not present, ceasing to periodically change the measurement parameter based on the obtained CH parameter.

6. The method of claim 1, wherein changing a measurement parameter based on the obtained CH parameter comprises determining that a CH condition is not present and as a result of the CH condition not being present, changing the measurement parameter.

7. The method of claim 6, wherein determining that the CH condition is not present comprises determining that the CH parameter exceeds a second CH threshold.

8. The method of claim 1, further comprising receiving from a network node an indication that the UE is allowed to perform optimizations based on the CH parameter.

9. A method performed by a network node, the method comprising:
  obtaining a channel hardening (CH) parameter corresponding to a user equipment (UE); and
  sending to the UE an indication that the UE is allowed to perform optimizations based on the obtained CH parameter.

10. The method of claim 9, further comprising collecting statistics regarding CH conditions at the UE.

11. The method of claim 9, further comprising signaling to the UE the CH parameter.

12. The method of claim 9, wherein obtaining the CH parameter comprises receiving the CH parameter from the UE.

13. The method of claim 9, further comprising adapting transmission of synchronization and reference signals based on the obtained CH parameter.

14. The method of claim 13, wherein adapting transmission of synchronization and reference signals based on the obtained CH parameter comprises reducing transmission of synchronization signal blocks (SSBs) and channel state information reference signals (CSI-RSs) based on the UE being in a CH condition.

15. A user equipment (UE) configured to:
  obtain an indication that a channel hardening (CH) condition is present;
  based on the indication that the CH condition is present, obtain a CH parameter;
  determine that the obtained CH parameter is less than a first CH threshold;
  in response to the obtained CH parameter being less than the first CH threshold, change a measurement parameter based on the obtained CH parameter; and
  adapt a measurement procedure in accordance with the changed parameter.

16. The UE according to claim 15, wherein the measurement procedure is a radio resource management (RRM) measurement which involves measuring a quantity including one or more of a channel quality indicator (COI), a reference signal received power (RSRP), a reference signal received quality (RSRQ), and a carrier received signal strength indicator (RSSI).

17. A network node configured to:
  obtain a channel hardening (CH) parameter corresponding to a user equipment (UE); and send to the UE an indication that the UE is allowed to perform optimizations based on the obtained CH parameter.

18. The network node according to claim 17, wherein the network node is further configured to collect statistics regarding CH conditions at the UE.

* * * * *